United States Patent
Sugihara et al.

(10) Patent No.: US 9,589,738 B2
(45) Date of Patent: Mar. 7, 2017

(54) SOLID ELECTROLYTE CAPACITOR AND A METHOD FOR MANUFACTURING THE SAME

(71) Applicant: TAYCA CORPORATION, Osaka-shi, Osaka (JP)

(72) Inventors: Ryosuke Sugihara, Osaka (JP); Kei Hirota, Osaka (JP)

(73) Assignee: TAYCA CORPORATION, Osaka (JP)

( * ) Notice: Subject to any disclaimer, the term of this patent is extended or adjusted under 35 U.S.C. 154(b) by 277 days.

(21) Appl. No.: 14/365,925

(22) PCT Filed: Dec. 11, 2012

(86) PCT No.: PCT/JP2012/082006
§ 371 (c)(1),
(2) Date: Jun. 16, 2014

(87) PCT Pub. No.: WO2013/094462
PCT Pub. Date: Jun. 27, 2013

(65) Prior Publication Data
US 2014/0334066 A1 Nov. 13, 2014

(30) Foreign Application Priority Data

Dec. 19, 2011 (JP) .................................. 2011-276821

(51) Int. Cl.
| | |
|---|---|
| H01G 9/04 | (2006.01) |
| H01G 11/04 | (2013.01) |
| H01G 9/028 | (2006.01) |
| H01G 9/035 | (2006.01) |
| H01G 9/00 | (2006.01) |

(52) U.S. Cl.
CPC .......... *H01G 11/04* (2013.01); *H01G 9/0029* (2013.01); *H01G 9/0036* (2013.01); *H01G 9/028* (2013.01); *H01G 9/035* (2013.01); *Y10T 29/417* (2015.01)

(58) Field of Classification Search
USPC .......................... 29/25.03; 252/62.2; 361/525
See application file for complete search history.

(56) References Cited

U.S. PATENT DOCUMENTS

| | | | |
|---|---|---|---|
| 2006/0152884 | A1 | 7/2006 | Yoshimitsu et al. |
| 2011/0171366 | A1* | 7/2011 | Ning ................. H01G 9/0036 427/80 |
| 2013/0258554 | A1 | 10/2013 | Ode et al. |

FOREIGN PATENT DOCUMENTS

| | | |
|---|---|---|
| EP | 0 556 948 A2 | 8/1993 |
| JP | 63-37610 A | 2/1988 |
| JP | 5-226189 A | 9/1993 |
| JP | 2003-100561 A | 4/2003 |
| JP | 2003-160647 A | 6/2003 |
| JP | 2004-265927 A | 9/2004 |
| JP | 2008-205496 A | 9/2008 |
| JP | 2008-251629 A | 10/2008 |
| JP | 2011-192924 A | 9/2011 |

OTHER PUBLICATIONS

International Search Report dated Feb. 19, 2013 issued in corresponding application No. PCT/JP2012/082006.

* cited by examiner

*Primary Examiner* — Eric Thomas
(74) *Attorney, Agent, or Firm* — Westerman, Hattori, Daniels & Adrian, LLP

(57) ABSTRACT

There is provided an electrolyte capacitor, which has a low ESR, and is superior in the heat resistance and reliable under a hot condition. The electrolyte capacitors in constructed by including a conductive polymer and a conductive auxiliary liquid having a lower conductivity than usual electrolyte, having a structure below. The conductive auxiliary liquid includes a high boiling point organic solvent having a boiling point of 150° C. or more, and an aromatic compound having at least one hydroxyl group. The aromatic compounds preferably includes an aromatic compound having at least one carboxyl group or an aromatic compound having at least one nitro group, or a combination of an aromatic compound having at least one carboxyl group with an aromatic compound having at least one nitro group.

19 Claims, No Drawings

SOLID ELECTROLYTE CAPACITOR AND A METHOD FOR MANUFACTURING THE SAME

TECHNICAL FIELD

The present invention relates to an electrolyte capacitor using both a conductive polymer and a conductive auxiliary liquid, as well as a method for manufacturing the same.

BACKGROUND OF THE INVENTION

For example, the conductive polymer has such a high conductivity that it is used as a solid electrolyte of solid electrolyte capacitors such as in tantalum solid electrolyte capacitors, aluminum solid electrolyte capacitors, and niobium solid electrolyte capacitors.

For example, the conductive polymers used in such application can be obtained by means of chemical oxidation polymerization or electrolytic oxidation polymerization of thiophene or its derivatives.

As a dopant, an organic sulfonic acid can be mainly used to carry out chemical oxidation polymerization of thiophene or its derivative as mentioned above. In particular, it is said that an aromatic sulfonic acid is suitable. As an oxidant, a transition metal is used. In particular, it is said that ferric one is suitable. Usually, a ferric salt of aromatic sulfonic acid can be used to serve as a dopant and oxidant upon the chemical oxidation polymerization of thiophene or its derivative.

Also, among the ferric salts of aromatic sulfonic acid, it was reported as follows: Particularly useful is ferric toluenesulfonate or ferric methoxybenzene sulfonate. In order to synthesize a conductive polymer using them, they are used as a dopant and oxidant and mixed with a polymerizable monomer such as thiophene or its derivatives. These processes are simple and suitable for industrialization (see patent reference No. 1, and patent reference No. 2).

However, the requests to improving the capacitor characteristics become higher and higher. There was a problem that a solid electrolyte capacitor only using the conductive polymer above as an electrolyte could not fully satisfy those requests.

Then, there was proposed an electrolyte capacitor using both a solid electrolyte of a conductive polymer, and electrolyte liquid (Patent Reference No. 3).

In such an electrolyte capacitor using the electrolyte liquid as explained above, a solution is used as an electrolyte liquid which dissolves ammonium dicarboxylates such as ammonium adipate in a solvent such as ethylene glycol. However, the electrolyte capacitor using a conductive polymer together with an electrolyte liquid could have improved characteristics compared with an electrolyte capacitor only using a conductive polymer as an electrolyte, but it still could not accomplish an electrolyte capacitor with a high performance as desired.

PRIOR ART REFERENCES

Patent References

Patent Reference No. 1: Japanese Laid-Open Patent Publication No. 2003-160647
Patent Reference No. 2: Japanese Laid-Open Patent Publication No. 2004-265927
Patent Reference No. 3: Japanese Laid-Open Patent Publication No. 2003-100561

SUMMARY OF THE INVENTION

The Objectives to Solve by the Invention

In view of the circumstances above, the objective of the present invention is to provide a high-performance electrolyte capacitor, that is, an electrolyte capacitor which has a low (small) ESR, and is superior in the heat resistance and reliable under a hot condition.

Means to Solve the Problem

The present invention was accomplished by finding that the objective above can be solved by an electrolyte capacitor which uses a conductive polymer together with a solution having a conductivity lower than normal electrolyte liquid (i.e., usually, having a conductivity of 3 mS/cm or more) (the solution is hereinafter referred to as "conductive auxiliary liquid.").

That is, the present invention relates to an electrolyte capacitor, comprising a conductive polymer and a conductive auxiliary liquid, wherein the conductive auxiliary liquid comprises a high boiling point organic solvent having a boiling point of 150° C. or more, and an aromatic compound having at least one hydroxyl group.

The conductive polymer can be provided by using a conductive polymer dispersion liquid, or synthesized by means of chemical oxidation polymerization of a monomer at a desired position, that is, so-called "on-site polymerization." Therefore, in the present application, the following two methods for manufacturing electrolyte capacitors are encompassed within the invention.

There is provided a manufacturing method of an electrolyte capacitor, comprising: providing a conductive polymer on a capacitor element by using a conductive polymer dispersion liquid, the capacitor element including a valve metal and a dielectric layer of an oxide layer of the valve metal formed on a surface of the valve metal; then, immersing the capacitor element in a conductive auxiliary liquid comprising a high boiling point organic solvent having a boiling point of 150° C. or more, and an aromatic compound having at least one hydroxyl group.

There is also provided a manufacturing method of an electrolyte capacitor, comprising: polymerizing a conductive polymer on a capacitor element by means of chemical polymerization of a monomer, the capacitor element including a valve metal and a dielectric layer of an oxide layer of the valve metal formed on a surface of the valve metal; removing impurities by washing before drying the capacitor element; then, immersing the capacitor element in a conductive auxiliary liquid comprising a high boiling point organic solvent having a boiling point of 150° C. or more, and an aromatic compound having at least one hydroxyl group.

In addition, in the manufacturing method of the electrolyte capacitor including the step of providing the conductive polymer on the capacitor element by using the former of the conductive polymer dispersion liquid, the following feature can be added. That is, before providing the conductive polymer on the capacitor element, a process can be added in which the capacitor element is treated with a solution dissolving a cyclic organic compound having at least one hydroxyl group and a high boiling point solvent having a boiling point of 150° C. or more in an organic solvent. Or, after providing the conductive polymer on the capacitor element, but before impregnating it with the conductive auxiliary liquid, the capacitor element having formed the conductive polymer is treated with a high boiling point organic solvent with a boiling point of 150° C. or more, or a solution including a high boiling point organic solvent with a boiling point of 150° C. or more at 20 mass % or more and less than 100 mass %. Doing so can produce an electrolyte capacitor which is superior in the characteristics such as accomplishment of having further lowered ESR. Thus, these processes are within the scope of the present invention.

Effect of the Invention

According to the present invention, there can provide a solid electrolyte capacitor with low ESR and that is reliable under a hot condition. Namely, the present invention uses both a conductive auxiliary liquid, which has a lower conductivity than the electrolyte liquid, together with a conductive polymer. As a result, it accomplished to obtain an inventive electrolyte capacitor with ESR lower than, heat resistance superior to, and a hot condition reliability more than, the electrolyte capacitor using an electrolyte having high conductivity together with a conductive polymer. Here, the present invention has been accomplished against the technique common sense in the technical area that the higher the conductivity is, the lower the ESR becomes.

EMBODIMENTS TO CARRY OUT THE INVENTION

In the present invention, the most significant feature is the conductive auxiliary liquid. This conductive auxiliary liquid has a conductivity which is lower than the conductivity of the electrolyte liquid. The conductivity of the conductive auxiliary liquid is lower than the conductivity of the electrolyte liquid (i.e., about 3 mS/cm or more). As the numerical range, it is preferably 2 mS/cm or less; and more preferably 1 mS/cm or less; and yet more preferably 600 μS/cm or less. Also, it is preferably 1 μS/cm or more; and more preferably 5 μS/cm or more; and furthermore preferably 8 μS/cm or more.

In other words, the conductive auxiliary liquid is not appropriate to improve the characteristics of the electrolyte capacitor if its conductivity becomes high like an electrolyte liquid. On the other hand, it will less contribute to the improvement of the characteristics of the electrolyte capacitor if its conductivity becomes too low. Thus, the conductivity is preferably in the range of 1 μS/cm to 2 mS/cm.

In the present invention, the conductivity of the conductive auxiliary liquid is measured at a temperature of 25° C., using a conductivity measurement instrument (F-55) made by Horiba Seisakusho, Ltd. (which is hereinafter simply referred to as Horiba, Ltd.). However, other conductivity measurement instrument equivalent thereto can be used to measure.

That is, the present invention relates to an electrolyte capacitor, comprising a conductive polymer and a conductive auxiliary liquid, in which the conductive auxiliary liquid comprises a high boiling point organic solvent having a boiling point of 150° C. or more, and an aromatic compound having at least one hydroxyl group. Here, with respect to the organic solvent having a boiling point of 150° C. or more, its boiling point shall be at 1 atm (i.e., 1013.25 hPa).

The example of the high boiling point organic solvent having a boiling point of 150° C. or more can include γ-butyrolactone (boiling point=204° C.), butanediol (boiling point=230° C.), dimethylsulfoxide (boiling point=189° C.), sulfolane (boiling point=285° C.), N-methylpyrrolidone (boiling point=202° C.), dimethylsulfolane (boiling point=233° C.), ethylene glycol (boiling point=198° C.), diethylene glycol (boiling point=244° C.), and polyethylene glycol, which can be used alone or in combination of two or more. It is noted that some kinds of polyethylene glycols do not have a boiling point under normal pressure, such as polyethylene glycol 600 and polyethylene glycol 1500 (here, the number just after the term "polyethylene glycol" means its molecular weight). However, no kinds of polyethylene glycols boil at a temperature of 150° C. or less under the normal pressure. In the present invention, polyethylene glycols shall be included as a group of the solvents having a high boiling point.

Such a high boiling point organic solvent with a boiling point of 150° C. or more is used as a solvent to dissolve an aromatic compound having at least one hydroxyl group in the conductive auxiliary liquid of the present invention. Since an organic solvent with such a high boiling point is used as a solvent in the present invention, the internal pressure during the solder heat resistance test can be suppressed from increase in a short term purpose, and also, the volatilization of the organic solvent can be suppressed in a long term purpose.

The aromatic compound having at least one hydroxyl group can include benzene compounds, naphthalene compounds, and anthracene compounds. The examples of the benzene compounds can include hydroxybenzene carboxylic acid, nitrophenol, dinitrophenol, trinitrophenol, aminonitrophenol, hydroxyanisole, hydroxydinitrobenzene, dihydroxydinitrobenzene, alkylhydroxyanisole, hydroxynitroanisole, hydroxynitrobenzene carboxylic acid (i.e., hydroxynitrobenzoic acid), dihydroxynitrobenzene carboxylic acid (i.e., dihydroxynitrobenzoic acid), phenol, dihydroxybenzene, trihydroxybenzene, dihydroxybenzene carboxylic acid, trihydroxybenzene carboxylic acid, hydroxybenzene dicarboxylic acid, dihydroxybenzene dicarboxylic acid, and hydroxytoluene carboxylic acid. The examples of the naphthalene compounds can include nitronaphthol, aminonaphthol, dinitronaphthol, hydroxynaphthalene carboxylic acid, dihydroxynaphthalene carboxylic acid, trihydroxynaphthalene carboxylic acid, hydroxynaphthalene dicarboxylic acid, and dihydroxynaphthalene dicarboxylic acid. The examples of the anthracene compounds can include hydroxyanthracene, dihydroxyanthracene, trihydroxyanthracene, tetrahydroxyanthracene, hydroxyanthracene carboxylic acid, hydroxyanthracene dicarboxylic acid, dihydroxyanthracene dicarboxylic acid, and tetrahydroxyanthracene dione. These compounds can be used alone or in combination of two or more. In addition, among the aromatic compounds having at least one hydroxyl group mentioned above, it is particularly preferable to use an aromatic compound having at least one carboxyl group or an aromatic compound having at least one nitro group. In particular, it is preferable to use a combination of an aromatic compound having at least one carboxyl group with an aromatic compound having at least one nitro group. When using the combination of an aromatic compound having at least one carboxyl group together with an aromatic compound having at least one nitro group, the ratio of both can be as follows. The mass ratio can be preferably 1000:1 to 1:100, and in particular, 50:1 to 1:1, for the aromatic compound having at least one carboxyl group to the aromatic compound having at least one nitro group.

The examples of the aromatic compound having at least one carboxyl group mentioned above can include hydroxybenzene carboxylic acid, dihydroxybenzene carboxylic acid, hydroxybenzene dicarboxylic acid, dihydroxybenzene dicarboxylic acid, aminohydroxybenzene carboxylic acid, hydroxytoluene carboxylic acid, hydroxynitrobenzene carboxylic acid (i.e., hydroxynitrobenzoic acid), dihydroxynitrobenzene carboxylic acid (i.e., dihydroxynitrobenzoic acid), hydroxynaphthalene carboxylic acid, acetylaminohydroxynaphthalene carboxylic acid, and hydroxyanthracene carboxylic acid. In particular, it is preferable to use hydroxybenzene carboxylic acid, dihydroxybenzene carboxylic acid, hydroxytoluene carboxylic acid, hydroxynitrobenzene carboxylic acid, hydroxynaphthalene carboxylic acid, and hydroxyanthracene carboxylic acid. The examples of the aromatic compound having at least one nitro group can include nitrophenol, dinitrophenol, trinitrophenol, hydroxydinitrobenzene, dihydroxydinitrobenzene, hydroxynitroanisole, aminonitrophenol, hydroxynitrobenzene carboxylic acid (i.e., hydroxynitrobenzoic acid), dihydroxynitrobenzene carboxylic acid (i.e., dihydroxynitrobenzoic acid), nitronaphthol, and dinitronaphthol. In particular, it is preferable to use nitrophenol, aminonitrophenol, hydroxynitrobenzene carboxylic acid (i.e., hydroxynitrobenzoic acid), and nitronaphthol.

The aromatic compound having at least one hydroxyl group is used in constitution of the conductive auxiliary liquid in the present invention. Therefore, the aromatic compound having at least one hydroxyl group has ability to assist the electronic conduction of the conductive polymer. In addition, it can suppress the deterioration of the conductive polymer based on the antioxidant action of the aromatic compound.

In the conductive auxiliary liquid mentioned above, the high boiling point organic solvent with a boiling point of 150° C. or more is a solvent, and the aromatic compound having at least one hydroxyl group is a solute. The concentration of the aromatic compound having at least one hydroxyl group in the conductive auxiliary liquid is preferably 0.5-50 mass %. In particular, it is preferably 2 mass % or more; and further preferably 5 mass % or more; also, it is preferably 30 mass % or less; and yet more preferably 20 mass % or less. In other words, when the concentration of the aromatic compound having at least one hydroxyl group is lower than the above range, the electrolyte capacitor might not result in low ESR, and deteriorate the heat resistance. On the other hand, when the concentration of the aromatic compound having at least one hydroxyl group is higher than the above range, the aromatic compound might precipitate, thereby making it difficult in handling, as well as deteriorate the ESR of the electrolyte capacitor.

In addition, when the conductive auxiliary liquid includes at least one binding agent selected from the group of epoxy compound or its hydrolysate, silane or its hydrolysate, and polyalcohol, the action to improve the voltage resistance of the electrolyte capacitor can be increased, and therefore, such inclusion is preferable.

The concentration of the binding agent mentioned above is preferably 0.05-20 mass %, and in particular, 0.5-5 mass % in the conductive auxiliary liquid.

The examples of the epoxy compound or hydrolysate as the binding agent as mentioned above can include polyethylene glycol diglycidyl ether, diethylene glycol glycidyl, glycidyl methacrylate, epoxypropanol (i.e., glycidol), methyl glycidyl ether, ethyl glycidyl ether, propyl glycidyl ether, butyl glycidyl ether, epoxybutane (i.e., glycidyl methane), epoxypentane (i.e., glycidyl ethane), epoxyhexane (i.e., glycidyl propane), epoxyheptane (i.e., glycidyl butane), epoxyoctane (i.e., glycidyl pentane), epoxycyclohexene, ethylene glycol diglycidyl ether, propylene glycol diglycidyl ether, butylene glycol diglycidyl ether, pentylene glycol diglycidyl ether, hexylene glycol diglycidyl ether, and glycerol diglycidyl ether. The examples of the silane compound or its hydrolysate can include 3-glycidoxypropyltrimethoxysilane, 2-(3,4-epoxycyclohexyl)ethyltrimethoxysilane, vinyltrimethoxysilane, p-styryltrimethoxysilane, 3-methacryloxypropylmethyldimethoxysilane, 3-acryloxypropyltrimethoxysilane, 3-mercaptopropylmethyldimethoxysilane, 3-isocyanatepropyltriethoxysilane, tetramethoxysilane, tetraethoxysilane, and silica sol. The examples of the polyalcohol can include polyethylene glycol, polypropylene glycol, and polybutylene glycol.

In addition, the conductive auxiliary liquid as mentioned above can include hydroxybenzene carboxylate alkyl ester having an alkyl group with a carbon number of 1-4, such as methyl hydroxybenzene carboxylate, ethyl hydroxybenzene carboxylate, propyl hydroxybenzene carboxylic acid, butyl hydroxybenzene carboxylic acid. If doing so, the heat resistance of the electrolyte capacitor can be improved and the ESR can be further lowered, thereby preferably improving the initial characteristics of the electrolyte capacitor.

The concentration of the hydroxybenzene carboxylate alkyl ester mentioned above is preferably 0.05-10 mass %, and in particular, 0.2-5 mass % in the conductive auxiliary liquid.

Furthermore, the conductive auxiliary liquid mentioned above can preferably include an unsaturated carboxylic acid or its ester, including acrylic acid, methacrylic acid, ethyl acrylate, propyl acrylate, butyl acrylate, hydroxyethyl acrylate, hydroxypropyl acrylate, hydroxybutyl acrylate, ethyl methacrylate, propyl methacrylate, butyl methacrylate, hydroxyethyl methacrylate, hydroxypropyl methacrylate, hydroxybutyl methacrylate, and glycidyl methacrylate. As a result, the heat resistance of the electrolyte capacitor can be improved. This is considered because the unsaturated carboxylic acid and the unsaturated carboxylate ester can polymerize by itself to cause oligomerization or polymerization, thereby preventing the conductive auxiliary liquid in the electrolyte capacitor from getting away during the storage of the electrolyte capacitor. Therefore, one which has been made oligomerization or polymerization in advance can be included if it dissolves in the conductive auxiliary liquid.

The concentration of the unsaturated carboxylic acid or its ester mentioned above is preferably 0.05-10 mass %, and in particular, 0.2-5 mass % in the conductive auxiliary liquid.

In the present invention, the monomer to synthesize the conductive polymer can include thiophene or its derivative, pyrrole or its derivative, and aniline or its derivative. In particular, thiophene or its derivative can be preferably used.

Regarding thiophene or its derivative, the examples of the derivative of thiophene can include 3,4-ethylenedioxythiophene, 3-alkylthiophene, 3-alkoxythiophene, 3-alkyl-4-alkoxythiophene, 3,4-alkylthiophene and 3,4-alkoxythiophene, and alkylated ethylenedioxythiophene which has modified 3,4-ethylenedioxythiophene with an alkyl group. The carbon number of the alkyl group and the alkoxy group can be preferably 1 to 16, and in particular, 1 to 4.

Further explanation is made for the alkylated ethylenedioxy thiophene in which 3,4-ethylenedioxy thiophene is modified with an alkyl group. 3,4-ethylenedioxy thiophene and the alkylated ethylenedioxy thiophene as mentioned above correspond to a compound represented by the following formula (1).

Formula (I)

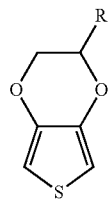

In the formula, R is hydrogen or an alkyl group.

In the formula (1) mentioned above, when R is hydrogen, it is 3,4-ethylenedioxythiophene. When it is expressed by the IUPAC name, it is 2,3-dihydro-thieno[3,4-b][1,4]dioxine. However, this compound is often expressed by its common name, "3,4-ethylenedioxythiophene," rather than the IUPAC name. Therefore, this specification refers it as "3,4-ethylenedioxythiophene" rather than "2,3-dihydro-thieno[3,4-b][1,4]dioxine." Also, when R in the formula (1) is an alkyl group, the alkyl group is preferably one with a carbon number of 1-4, that is, methyl group, ethyl group, propyl group, butyl group. Specifically, when R in formula (1) is methyl group, such a compound is expressed as 2-methyl-2,3-dihydro-thieno[3,4-b][1,4]dioxine under the IUPAC name, which is hereinafter simply referred to as "methylated ethylenedioxythiophene." When R in formula (1) is ethyl group, such a compound is 2-ethyl-2,3-dihydro-thieno[3,4-b][1,4]dioxine)" under the IUPAC name. Hereinafter, this compound is simply referred to as "ethylated ethylenedioxythiophene." When R in formula (1) is propyl group, such a compound is 2-propyl-2,3-dihydro-thieno[3,4-b][1,4]dioxine under the IUPAC name. Hereinafter, this compound is simply referred to as "propylated ethylenedioxythiophene." Also, when R in formula (1) is butyl group, such a compound is 2-butyl-2,3-dihydro-thieno[3,4-b][1,4]dioxine under the IUPAC name. Hereinafter, this compound is simply referred to as "butylated ethylenedioxythiophene." In addition, "2-alkyl-2,3-dihydro-thieno[3,4-b][1,4]dioxine" is simply referred to as "alkylated ethylenedioxythiophene." Here, among these alkylated ethylenedioxy thiophenes, preferable are methylated ethylenedioxythiophene, ethylated ethylenedioxythiophene, propylated ethylenedioxythiophene, and butylated ethylenedioxythiophene.

These alkylated ethylenedioxy thiophenes can be used alone or in combination of two or more. Furthermore, these alkylated ethylenedioxythiophenes can be used together with 3,4-ethylenedioxythiophene. In addition, the synthesis methods of methylated ethylenedioxythiophene, ethylated ethylenedioxythiophene, propylated ethylenedioxythiophene and butylated ethylenedioxythiophene are disclosed in International Patent Publication No. 2011/068026 and International Patent Publication No. 2011/074380, filed by the applicant of the present application.

The conductive polymer for the electrolyte capacitor of the present invention can be one which uses a conductive polymer dispersion liquid, as well as one in which a monomer is polymerized by so-called "on-site polymerization."

When using the conductive polymer dispersion liquid as mentioned above, a known kinds of dopant can be used to synthesize the conductive polymer. In particular, preferable are polystyrene sulfonic acid, sulfonated polyester, phenolsulfonic acid novolac resin, and macromolecule sulfonic acid polymer anion (high polymer dopant) made by copolymerizing styrenesulfonic acid and a non-sulfonic acid monomer selected from the group of methacrylate, acrylate and unsaturated hydrocarbon containing alkoxysilane compound, and hydrolysate thereof.

Regarding the polystyrene sulfonate above, its weight average molecular weight can be preferably 10,000 to 1,000,000.

Namely, when the weight average molecular weight of the polystyrene sulfonic acid above is smaller than 10,000, thereby obtained conductive polymer might have a low conductivity. By contrast, when the weight average molecular weight of the polystyrene sulfonate above is larger than 1,000,000, the viscosity of the dispersion liquid of the conductive polymer becomes high, and therefore, it might be difficult to handle it in the production of an electrolyte capacitor. Furthermore, within the range of the weight average molecular weight of the polystyrene sulfonic acid mentioned above, it is preferably 20,000 or more, and more preferably 40,000 or more, and also, it is preferably 800,000 or less, and more preferably 300,000 or less.

The sulfonated polyester above can be obtained by condensation polymerization from dicarboxy benzenesulfonic acid diester such as sulfoisophthalate and sulfoterephthalate, and alkylene glycol in the presence of a catalyst such as antimony oxide or zinc oxide. The weight average molecular weight of the sulfonated polyesters can be preferably 5,000 to 300,000.

Namely, when the weight average molecular weight of the sulfonated polyester is lower than 5,000, thereby obtained conductive polymer might have a low conductivity. Also, when the weight average molecular weight of the sulfonated polyester above is larger than 300,000, the viscosity of the dispersion liquid of the conductive polymer becomes high, and therefore, it might be difficult to handle it in the production of an electrolyte capacitor. Furthermore, within the range of the weight average molecular weight of the sulfonated polyester above, it is preferably 10,000 or more, and more preferably 20,000 or more, and also, it is preferably 100,000 or less, and more preferably 80,000 or less.

The phenolsulfonic acid novolac resin as mentioned above can preferably include the repeating unit represented by formula (2).

Formula (2)

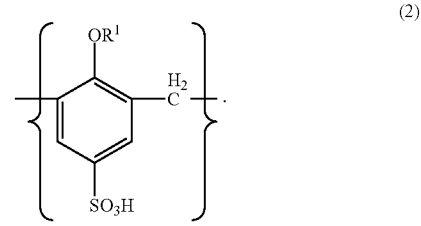

In formula (1), $R^1$ is hydrogen or methyl group. The weight average molecular weight of the phenolsulfonic acid novolac resin can be preferably 5,000-500,000.

Namely, when the weight average molecular weight of the phenolsulfonic acid novolac resin above is smaller than 5,000, thereby obtained conductive polymer might be low in the conductivity. By contrast, when the weight average molecular weight of the phenolsulfonic acid novolac resin above is larger than 500,000, the viscosity of the dispersion liquid of the conductive polymer becomes high, and therefore, it might be difficult to handle it in the production of an electrolyte capacitor. Furthermore, within the range of the weight average molecular weight of the phenolsulfonic acid novolac resin above, it is preferably 10,000 or more, and also, it is preferably 400,000 or less, and more preferably 80,000 or less.

The polymer anion such as polystyrene sulfonic acid, sulfonated polyester, and phenolsulfonic acid novolac resin as mentioned above can be used alone or in combination of two kinds or more.

A copolymer made from styrenesulfonic acid, and at least one kind of a non-sulfonic acid monomer selected from the group of methacrylate, acrylate, and unsaturated hydrocarbon containing alkoxysilane compound or a hydrolysate, thereof (which is hereinafter referred to as "copolymer of styrenesulfonic acid and non-sulfonic acid monomer"), is used as dopant. Thereby obtained conductive polymer of thiophene or its derivative obtained by oxidation polymerization has high conductivity and superior heat resistance. Therefore, it is suitable to manufacture an electrolyte capacitor which is low in ESR, reliable under a hot condition, and causes less leakage current.

Explained here is the polymerization of the copolymer from styrenesulfonic acid, and at least one kind of a non-sulfonic acid monomer selected from the group of methacrylate, acrylate, and unsaturated hydrocarbon containing alkoxysilane compound or a hydrolysate thereof. As the monomer to be copolymerized with styrenesulfonic acid, used is at least one kind of a non-sulfonic acid monomer selected from the group of methacrylate, acrylate, and unsaturated hydrocarbon containing alkoxysilane compound or a hydrolysate thereof. The examples of the methacrylate as mentioned above can include methyl methacrylate, ethyl methacrylate, propyl methacrylate, butyl methacrylate, hexyl methacrylate, stearyl methacrylate, cyclohexyl methacrylate, diphenylbutyl methacrylate, dimethylaminoethyl methacrylate, diethylaminoethyl methacrylate, sodium sulfohexyl methacrylate, glycidyl methacrylate, methylglycidyl methacrylate, hydroxyalkyl methacrylate, (namely, hydroxyalkyl methacrylate such as hydroxymethyl methacrylate, hydroxyethyl methacrylate, hydroxypropyl methacrylate, hydroxybutyl methacrylate, hydroxyhexyl methacrylate, hydroxystearyl methacrylate), hydroxypolyoxyethylene methacrylate, methoxyhydroxypropyl methacrylate, ethoxyhydroxypropyl methacrylate, dihydroxypropyl methacrylate, and dihydroxybutyl methacrylate. In particular, preferable are hydroxyalkyl methacrylate such as hydroxymethyl methacrylate, hydroxyethyl methacrylate, hydroxypropyl methacrylate and hydroxybutyl methacrylate. The carbon number of these compounds is 1 to 4. It is preferable to exhibit a characteristic serving as a dopant when it is copolymerized with styrenesulfonic acid. Also, the compounds such as glycidyl methacrylate and methylglycidyl methacrylate include glycidyl group. These compounds have a structure having hydroxyl group when opening the glycidyl group. Therefore, in the same reasons as the hydroxyalkyl methacrylate, a compound having a glycidyl group is also preferable in view of the characteristic serving as a dopant when it is copolymerized with styrenesulfonic acid.

The examples of the acrylate as mentioned above can include methyl acrylate, ethyl acrylate, propyl acrylate, butyl acrylate, hexyl acrylate, stearyl acrylate, cyclohexyl acrylate, diphenylbutyl acrylate, dimethylaminoethyl acrylate, diethylaminoethyl acrylate, sodium sulfohexyl acrylate, glycidyl acrylate, methylglycidyl acrylate, hydroxyalkyl acrylate, (namely, hydroxyalkyl acrylate such as hydroxymethyl acrylate, hydroxyethyl acrylate, hydroxypropyl acrylate, and hydroxybutyl acrylate). In particular, preferable are hydroxymethyl acrylate, hydroxyethyl acrylate, hydroxypropyl acrylate and hydroxybutyl acrylate. The carbon number of these compounds is 1 to 4. These compounds are preferable in view of the characteristic serving as a dopant when it is copolymerized with styrenesulfonic acid. Also, the compounds such as glycidyl acrylate and methylglycidyl acrylate include glycidyl group. These compounds have a structure having hydroxyl group when opening the glycidyl group. Therefore, in the same reasons as the hydroxyalkyl acrylate, a compound having a glycidyl group is also preferable in view of the characteristic serving as a dopant when it is copolymerised with styrenesulfonic acid.

As the unsaturated hydrocarbon containing alkoxysilane compound or its hydrolysate as mentioned above, the followings can be exemplified. That is, the examples thereof can include an unsaturated hydrocarbon containing alkoxysilane compound and its hydrolysate such as 3-methacryloxypropyltrimethoxysilane, 3-methacryloxypropylmethyldimethoxysilane, 3-methacryloxypropyldimethylmethoxysilane, 3-methacryloxypropyldimethylethoxysilane, 3-methacryloxypropyltriethoxysilane, 3-acryloxypropyltrimethoxysilane, 3-acryloxymethyldimethoxysilane, 3-acryloxymethyldiethoxysilane, 3-acryloxytriethoxysilane, P-styryltrimethoxysilane, p-styryltriethoxysilane, p-styrylmethyldimethoxysilane, vinyltrimethoxysilane, vinyltriethoxysilane, vinylmethyldimethoxysilane, and vinyldimethylmethoxysilane. The hydrolysate of such an unsaturated hydrocarbon containing alkoxysilane compound can be as follows. For example, if the unsaturated hydrocarbon containing alkoxysilane compound is 3-methacryloxypropyltrimethoxysilane as mentioned above, it can be a compound having a structure in which its methoxy group is hydrolyzed to become hydroxyl group (i.e., 3-methacryloxypropyltrihydroxysilane), or a compound having a structure in which silane groups are condensed each other to form an oligomer while its methoxy group that has not been involved in the reaction becomes hydroxyl group. Also, as the unsaturated hydrocarbon containing alkoxysilane compound, favorable are 3-methacryloxypropyltrimethoxysilane, 3-acryloxypropyltrimethoxysilane, p-styryltrimethoxysilane, vinyltrimethoxysilane in view of serving as a dopant when copolymerized with styrenesulfonic acid.

Also, the following feature can be provided in the copolymer made from styrenesulfonic acid, and at least one kind of a non-sulfonic acid monomer selected from the group of methacrylate, acrylate, and unsaturated hydrocarbon containing alkoxysilane compound or hydrolysate thereof. A mass ratio of 1:0.01 to 0.1:1 is preferable for the styrenesulfonic acid, to said at least one kind of the non-sulfonic acid monomer selected from the group of methacrylate, acrylate, and unsaturated hydrocarbon containing alkoxysilane compound or hydrolysate thereof.

Also, the following feature is found in the copolymer made from styrenesulfonic acid, and at least one kind of a non-sulfonic acid monomer selected from the group of methacrylate, acrylate, and unsaturated hydrocarbon containing alkoxysilane compound or its hydrolysate. Regarding the molecular weight, it has a weight average molecular weight of about 5,000-500,000 in view of the characteristics of water-solubility and dopant. In particular, it preferably has a weight average molecular weight of about 40,000-200,000.

The copolymer of styrenesulfonic acid and the non-sulfonic acid monomer above can be used together with a polymeric sulfonic acid such as polystyrene sulfonic acid, sulfonated polyester, and phenolsulfonic acid novolac resin, as mentioned above. Also, for use, a dispersion liquid of a conductive polymer synthesized by using the copolymer from styrenesulfonic acid and the non-sulfonic acid monomer as a dopant can be mixed with another dispersion liquid of a conductive polymer synthesized by using the polymeric sulfonic acid as a dopant.

Next, explained is the means to polymerize a conductive polymer by means of oxidation polymerization of a monomer with a polymer anion as dopant (here, the most typical monomer, that is, thiophene or its derivative is exemplified). Listed here is polystyrene sulfonic acid, sulfonated polyester, phenolsulfonic acid novolac resin, and a copolymer of styrenesulfonic acid and a non-sulfonic acid monomer (i.e., a compolymer from styrenesulfonic acid and a non-sulfonic acid monomer selected from the group of methacrylate, acrylate and an unsaturated hydrocarbon containing alkoxysilane compound, and hydrolyzate thereof). All of the lists above have solubility to water, or an aqueous solution of a mixture of water and a water-miscible solvent. Thus, the oxidation polymerization is performed in water or an aqueous solution.

As the water-miscible solvent constituting the aqueous solution mentioned above, the example can include methanol, ethanol, propanol, acetone, and acetonitrile. The mixing ratio of the water-miscible solvent with respect to water can be preferably 50% by mass or less.

The oxidation polymerization for preparing the conductive polymer can be either chemical oxidation polymerization or electrolytic oxidation polymerization.

To perform the chemical oxidation polymerization, a persulfate can be used as an oxidant, for example. The example of the persulfates can include ammonium persulfate, sodium persulfate, potassium persulfate, calcium persulfate, and barium persulfate.

Regarding the chemical oxidation polymerization, the condition during the polymerization is not particularly limited. The temperature in the chemical oxidation polymerization can be preferably 5° C. to 95° C., and in more particular, it can be 10° C. to 30° C. The polymerization period can be preferably one hour to 72 hours, and in more particular, it can be eight hours to 24 hours.

The electrolytic oxidation polymerization can be carried out either in constant current or constant voltage. For example, when the electrolytic oxidation polymerization is performed in constant current, its current value can be preferably 0.05 mA/cm2 to 10 mA/cm2, and in particular, it can be 0.2 mA/cm2 to 4 mA/cm2. When the electrolytic oxidation polymerization is performed in constant voltage, its voltage can be preferably 0.5V to 10V, and in more particular, it can be 1.5V to 5V. The temperature in the electrolytic oxidation polymerization can be preferably 5° C. to 95° C., and in more particular, it can be 10° C. to 30° C. The polymerization period can be preferably one hour to 72 hours, and in more particular, it can be eight hours to 24 hours. In addition, upon the electrolytic oxidation polymerization, ferrous sulfate or ferric sulfate can be added as a catalyst.

Just after the polymerization as prepared above, the conductive polymer can be in a dispersion state in water or the aqueous solution, and includes persulfate used as an oxidant, or an iron sulfate or its decomposition product used a catalyst. Therefore, the dispersion liquid of the conductive polymer including the impurities is applied to a dispersion machine such as a ultrasonic homogenizer, high-pressure homogenizer or planetary ball mill to disperse the impurities. Then, the metal components are favorably removed with a cation-exchange resin. At this time, the particle size of the conductive polymer measured by means of dynamic light scattering can be preferably 100 μm or less, and in particular 10 μm or less. Also, it is preferably 0.01 μm or more, and in particular 0.1 μm or more. Then, a process such as ethanol precipitation process, ultrafiltration process and anion exchange resin process can be applied to remove the compounds generated by decomposition of the oxidant and the catalyst. As described later, if necessary, a conductive improver and a binder can be added.

The conductive polymer dispersion liquid thus prepared can include a conductive improver as described above. In this way, when such a conductive improver is included in the conductive polymer dispersion liquid, the conductivity of a conductive polymer film made by drying the conductive polymer dispersion liquid can be improved. Thereby, when preparing an electrolyte capacitor by using the conductive polymer as an electrolyte, its ESR can be lowered.

The reason is considered as follows. When preparing the solid electrolyte capacitor, a capacitor element is immersed in the dispersion liquid of the conductive polymer, and then, it is taken out and dried. At this time, the layer density in the thickness direction of the conductive polymer can be increased. Thereby, a space between the conductive polymers becomes small. As a result, a conductivity of the conductive polymer becomes high. Therefore, when such a conductive polymer is used as an electrolyte of an electrolyte capacitor, it is considered that the ESR of the electrolyte capacitor can be lowered.

The examples of the conductive improver can include: organic solvents with a high boiling point (e.g., a high boiling point of 150° C. or more) such as dimethylsulfoxide, γ-butyrolactone, sulfolane, N-methylpyrrolidone, dimethylsulfone, ethylene glycol, diethylene glycol and polyethylene glycol; and saccharides such as erythritol, glucose, mannose and pullulan. In particular, dimethylsulfoxide and butanediol are preferable.

The conductive improver can be added at an amount below. It is preferable to add 5 to 3,000% by mass standard with respect to the conductive polymer in the dispersion liquid (namely, the conductive improver is added at 5-3,000 parts by mass with respect to 100 parts by mass of the conductive polymer). In particular, it can be added at 20-700%. When the conductive improver is added at an amount less than the range above, the effects to improve the conductivity might not be provided enough. By contrast, when the conductive improver is added at an amount more than the range above, it might take additional time to dry the dispersion liquid, as well as it might cause deterioration to reduce the conductivity.

In addition, since the content of the conductive polymer in the dispersion liquid affects the handling properties of immersing a capacitor element therein and taking it out therefrom. Thus, it is usually preferable to adjust it at about a level of 0.5 to 15 mass %. In other words, when the content of the conductive polymer is less than the range above, it might take additional time for drying. By contrast, when the content of the conductive polymer is more than the range above, the viscosity of the dispersion liquid is increased, and thereby, the handling properties in producing an electrolyte capacitor might be deteriorated.

The conductive polymer obtained by drying the conductive polymer dispersion liquid as described above can be provided with the following features. That is, based on the characteristics of the polymer anion used as a dopant upon synthesis, it has high conductivity and superior heat resistance. Therefore, when it is used as an electrolyte, the electrolyte capacitor thus prepared can result in low ESR and high reliability under a hot condition.

When using the conductive polymer dispersion liquid of the present invention to prepare an electrolyte capacitor, a capacitor element is immersed in the conductive polymer dispersion liquid, and then taken out (pulled up), The conductive polymer after drying it can be used as an electrolyte. This conductive polymer will be provided on an dielectric layer made of a valve metal oxide layer which is formed on the surface of the valve metal to become a positive electrode in the capacitor element. However, the conductive polymer may be attached to other parts of the capacitor element. Alternatively, instead of immersing the capacitor element in the conductive polymer dispersion liquid as explained above, the conductive polymer dispersion liquid can be sprayed or applied on the capacitor element.

In addition, in the production above, for the purpose to increase the adhesion between the conductive polymer and the dielectric layer of the capacitor element, a binder can be added in the conductive polymer dispersion liquid. The example of such a binder can include polyvinyl alcohol, polyurethane, polyester, acrylic resin, polyamide, polyimide, epoxy resin, polyacrylonitrile resin, polymethacrylonitrile resin, polystyrene resin, novolac resin, sulfonated polyallyl, sulfonated polyvinyl, sulfonated polystyrene, and a silane coupling agent. In particular, preferably are polyester, polyurethane, acrylic resin, sulfonated polyallyl, sulfonated polyvinyl, and sulfonated polystyrene. In particular, preferably is one in which a sulfone group is included like sulfonated polyallyl, sulfonated polyvinyl, and sulfonated polystyrene, since the conductivity of the conductive polymer can be improved.

When the conductive polymer dispersion liquid as mentioned above is used in the production of the winding-type electrolyte capacitor, the following process can be performed, for example. A surface of a valve metal foil such as aluminum foil is applied to an etching treatment. Then, a chemical conversion treatment is performed to form a dielectric layer of an oxide layer of the valve metal as mentioned above, thereby obtaining a positive electrode, to which a lead terminal is attached. Also, a lead terminal is attached to a negative electrode of a valve metal foil such as aluminum foil. The positive electrode and the negative electrode, each having the lead terminal, were wound with an intervention of a separator. The capacitor element thus prepared is immersed in the conductive polymer dispersion liquid, and taken it out, and dried. These steps are repeated to form a layer of the conductive polymer. Then, the capacitor element as mentioned above is immersed with the conductive auxiliary liquid. Thereafter, an exterior material is provided outside thereof. Thereby, a winding-type electrolyte capacitors can be produced.

For example, the following process can be performed to immerse the capacitor element having formed the conductive polymer on the dielectric layer with the conductive auxiliary liquid. That is, the capacitor element above is immersed with the conductive auxiliary liquid. When the capacitor element is taken out from the conductive auxiliary liquid, the conductive auxiliary liquid is mainly held by the separator and the conductive polymer. Namely, the separator is made of a porous body, and also, the conductive polymer is microscopically porous. Thus, the conductive auxiliary liquid can enter the pores thereof, and maintained in that state.

Also, the explanation here is when the conductive polymer dispersion liquid mentioned above is used in the preparation of non-winding-type electrolyte capacitors such as tantalum electrolyte capacitor, niobium electrolyte capacitor, and laminated-type aluminum electrolyte capacitor. For example, a capacitor element to become a positive electrode is provided, which includes a porous body of valve metal such as tantalum, niobium and aluminum, and a dielectric layer of an oxide layer of the valve metal. The capacitor element is immersed in the conductive polymer dispersion liquid, and taken it out and dried it. The steps of immersing with the dispersion liquid and drying are repeated to form a layer of the conductive polymer. Then, the capacitor element as mentioned above is immersed with the conductive auxiliary liquid. Then, a carbon paste and a silver paste are applied, and then dried. Then, an exterior is provided. Thereby, a tantalum electrolyte capacitor, a niobium electrolyte capacitor, and a laminated-type aluminum electrolyte capacitor can be obtained. Alternatively, instead of immersing the capacitor element in the conductive polymer dispersion liquid as explained above, the conductive polymer dispersion liquid can be sprayed or applied on the capacitor element.

Also, when a conductive polymer to synthesized by "on-site polymerization" is used, for example, an organic sulfonic acid such as aromatic sulfonic acid is used as a dopant. Into a liquid including a monomer and an oxidant, the capacitor element above is immersed, and then taken out and dried to carry out polymerization. Then, it is immersed in water, and taken out and washed. Thereby, a conductive polymer is synthesized on the capacitor element by so-called "on-site polymerization." Then, the whole is immersed in the conductive auxiliary liquid to impregnate the capacitor element with the conductive auxiliary liquid. Thereby, an electrolyte capacitor can be produced by providing the capacitor element with an exterior as designed. In this case, instead of immersing the capacitor element in a liquid including a monomer and an oxidant, such a liquid including the monomer and the oxidant can be sprayed or applied on the capacitor element. Not only this case but also, when the conductive polymer is formed on the capacitor element by using the conductive polymer dispersion liquid, the impregnation of the conductive auxiliary liquid can be performed by spraying or applying the conductive auxiliary liquid on the capacitor element, instead of immersing the capacitor element in the conductive auxiliary liquid.

As described before, in the present application, when providing the conductive polymer on the capacitor element by using the conductive polymer dispersion liquid, the following feature can be included. That is, as a pretreatment, the scope of the invention includes a case where the capacitor element is treated with a solution which dissolves a cyclic organic compound having at least one hydroxyl group and a high boiling point solvent of 150° C. or more in an organic solvent (hereinafter, this solution can be called as "pretreatment solution"). As the cyclic organic compound having at least one hydroxyl group to be used in the preparation of such a pretreatment solution, the same of the aromatic compound as used in the preparation of the conductive auxiliary liquid can be used. Also, as the high boiling point organic solvent to be used in the preparation of the pretreatment solution, the same high boiling point solvent as used in the preparation of the conductive auxiliary liquid can be used.

In the pretreatment solution above, the high boiling point solvent having a boiling point of 150° C. or more coexists with the cyclic organic compound having at least one hydroxyl group. This is in order to make the electrolyte capacitor lower its ESR as well as enlarge its capacitance. It is considered that when drying the pretreatment solution, the high boiling point solvent having a boiling point of 150° C. or more can partly remain, thereby making better the affinity between the cyclic organic compound having at least one hydroxyl group and the conductive polymer. In other words, in a complete dry state, the affinity between the cyclic organic compound having at least one hydroxyl group and the conductive polymer is worse. Thus, the characteristic improvement of the electrolyte capacitor based on the cyclic organic compound having at least one hydroxyl group cannot be fully accomplished. However, when the high boiling point solvent having a boiling point of 150° C. or more partly is left therein, the affinity between the cyclic organic compound having at least one hydroxyl group and the conductive polymer can be improved. Thereby, it is considered that the characteristic improvement of the electrolyte capacitor based on the cyclic organic compound having at least one hydroxyl group can be accomplished.

The examples of the organic solvent to be used to prepare the pretreatment solution above can include lower alcohols such as methanol, ethanol, propanol and butanol; and organic solvents having a low boiling point, such as acetonitrile, acetone, tetrahydrofuran, and ethyl acetate.

The low boiling point as mentioned above means that the boiling point is lower than that of the high boiling point solvent having a boiling point of 150° C. or more. The drying step in the pretreatment process is carried out mainly for the purpose to remove this organic solvent as a solvent. The drying step is usually performed at a temperature higher than the boiling point of this organic solvent.

Also, at the time of drying, the high boiling point solvent having a boiling point of 150° C. or more in the pretreatment solution will be mostly removed by azeotropy with the organic solvent above. However, a part thereof can remain in such a manner that it adheres to the cyclic organic compound having at least one hydroxyl group. As explained before, the one party remaining can improve the affinity between the cyclic organic compound having at least one hydroxyl group and the conductive polymer. In this way, it is considered to contribute to the characteristic improvement by the cyclic organic compound having at least one hydroxyl group.

The boiling point of the high boiling point solvent mentioned above is 150° C. or more. This is because it does not impart adverse affects on the heat resistance of the electrolyte capacitor even if it is left in the electrolyte capacitor, as well as because one of the tests adopted is a storage test at 150° C. to evaluate the heat resistance of the electrolyte capacitors.

In addition, in the pretreatment solution above, concentration of the cyclic organic compound having at least one hydroxyl group is preferably 0.1-50 mass %, and more preferably, it is 1 mass % or more, and 10 mass % or less. Also, the concentration of the high boiling point solvent having a boiling point of 150° C. or more is preferably 0.05-10 mass %, and more preferably, it is 0.2 mass % or more, and 5 mass % or less.

Also, when a lower alcohol such as methanol and ethanol is used as an organic solvent in the preparation of the pretreatment solution above, the following feature can be considered. That is, in order to increase the solubility of the cyclic organic compound having at least one hydroxyl group, the example to be included can be a lower amine compound such as methylamine, dimethylamine, trimethylamine, ethylamine, diethylamine, triethylamine, and ethylene diamine; and a basic substance such as ammonia, imidazole, methylimidazole, methylethylimidazole, methylbutylimidazole.

Furthermore, when adding one such as 3-glycidoxypropyltrimethoxysilane, polyethylene glycol diglycidyl ether, diethylene glycol glycidyl, and glycidyl methacrylate in the pretreatment solution mentioned above, it is preferable because the voltage resistance of the electrolyte capacitor can be improved. The addition amount of such a voltage resistance improver such as 3-glycidoxypropyltrimethoxysilane into the solution including the cyclic organic compound having at least one hydroxyl group is as follows. With respect to the cyclic organic compound having at least one hydroxyl group, it is preferably 0.1-1000 mass % (namely, with respect to 100 mass parts of the cyclic organic compound having at least one hydroxyl group, it is 0.1-1000 mass parts of the voltage resistance improver). In particular, it can be preferably 10 mass % or more, and 300 mass % or less.

The pretreatment by the pretreatment solution can be performed by immersing the capacitor element in the pretreatment solution above, and taken out and dried. Alternatively, the pretreatment solution can be sprayed on, or applied on, the capacitor element, and then, dried.

In addition, as explained before, the scope of the present invention includes the case as follows. After the process to make the conductive polymer on the capacitor element by using the conductive polymer dispersion liquid, and before the process to impregnate it with the conductive auxiliary liquid, the capacitor element can be treated with a high boiling point organic solvent with a boiling point of 150° C. or more, or a solution including a high boiling point organic solvent with a boiling point of 150° C. or more at an amount of 20 mass % or more, and less than 100 mass %. The examples of such a high boiling point organic solvent with a boiling point of 150° C. or more can include: ethylene glycol (boiling point=198° C.), dimethylsulfoxide (boiling point=189° C.), γ-butyrolactone (boiling point=203° C.), sulfolane (boiling point=285° C.), N-methylpyrrolidone (boiling point=202° C.), dimethylsulfolane (boiling point=233° C.), butanediol (boiling point=230° C.), diethylene glycol (boiling point=244° C.), glycerol (glycerin) (boiling point=290° C.), and triethylene glycol (boiling point=288° C.). In the present invention, it is particularly preferable to use one with a boiling point of 180° C. to 210° C. in view of the handling property and the characteristics to be imparted. Specifically preferable are ethylene glycol (boiling point=198° C.), dimethylsulfoxide (boiling point=189° C.), and γ-butyrolactone (boiling point=203° C.).

Explained here is the solvent to be used in the preparation of the solution including the high boiling point organic solvent with a boiling point of 150° C. or more at an amount of 20 mass % or more, and less than 100 mass %. It is not particularly limited. The examples to be used can include a lower alcohol having a carbon number of 1-4 such as ethanol, methanol, propanol and butanol, water, acetonitrile, acetone, tetrahydrofuran, and ethyl acetate. Particularly preferable are methanol, ethanol, propanol, butanol and water.

Here, the content of the high boiling point organic solvent with a boiling point of 150° C. or more is 20 mass % more than in the solution above. This is because of the following reason. That is, if the concentration of the high boiling point organic solvent is lower than 20 mass %, the use of the solution cannot fully result in improving the capacitor characteristics such as lowering the ESR.

Also, an additive can be added to the high boiling point organic solvent with a boiling point of 150° C. or more, or the solution including the high boiling point organic solvent with a boiling point of 150° C. or more at an amount of 20 mass % or more, and less than 100 mass %. The examples of the additive can include butyl p-hydroxybenzene carboxylate, p-nitrophenol, methyl p-hydroxybenzene carboxylate, ethyl p-hydroxybenzene carboxylate, propyl p-hydroxybenzene carboxylate, p-hydroxybenzene carboxylic acid, o-hydroxybenzene carboxylic acid, butyl o-hydroxybenzene carboxylate, butyl m-hydroxybenzene carboxylate, o-nitrophenol, m-nitrophenol, benzene dicarboxylic acid, and dinitrophenol. By doing this, it is preferably to improve the capacitor properties. Particularly preferable are butyl p-hydroxybenzene carboxylate, p-nitrophenol and p-hydroxybenzene carboxylic acid, in view of improving the capacitor properties such as significant reduction of the ESR and significant improvement of the charge discharge properties. The additive above is preferably included at a concentration of 0.5 mass % or more in the high boiling point organic solvent with a boiling point of 150° C. or more, or in the solution including the high boiling point organic solvent mentioned at a specific ratio. More preferably, it is included at a concentration of 1 mass % or more. However, if excessively included, the ESR might result in increase. Thus, it is preferably at a concentration of 20 mass % or less, and in particular, at a concentration of 10 mass % or less. In addition, the benzene additives above have a functional group such as hydroxyl group, nitro group, carboxyl group, and carboxy ester group. When using two or more kinds of additives, each having different functional group, the characteristics can be further improved favorably. Also, when using a benzene compound having two or more kinds of functional groups above, favorable effects can be obtained at a similar level to or more level than using two or more kinds additives, each having different functional group.

In addition to the additive above; the examples to be further added can include: alkoxy silane compounds such as 3-glycidoxypropyltrimethoxysilane, acryloxypropyltrimethoxysilane, methacryloxypropyltrimethoxysilane, vinylsilane, tetramethoxysilane, tetraethoxysilane, methyltrimethoxysilane, butyltrimethoxysilane, 3-aminopropyltrimethoxysilane, 3-phenylaminopropyltrimethoxysilane, and 2-(3,4-epoxycyclohexyl)ethyltrimethoxysilane; and glycidyl compounds such as ethylene glycol diglycidyl, polyethylene glycol diglycidyl, glycidyl methacrylate, glycidic acid, glycidate, and pentaerythritol glycidyl ether. Also, epoxy resin, and polyhydric alcohols such as polyethylene glycol 400, polyethylene glycol 600, polyethylene glycol 1500, diglycerol, and polyglycerol can be added. When adding the alkoxysilane compounds or the glycidyl compounds as explained above, capacitor properties can be improved, in particular, like enlarging the capacitance or increasing the break voltage or improving the voltage resistance characteristic. Also, similar effects can be obtained when adding the epoxy resin or the polyhydric alcohols having very high boiling point, in the high boiling point organic solvent with a boiling point of 150° C. or more. It is preferable that these additives can be added at an amount of 0.1 mass % or more in the high boiling point organic solvent with a boiling point of 150° C. or more, or in the solution including the high boiling point organic solvent at in a specific ratio. In particular, it is preferably added at an amount of 0.5 mass % or more. However, when the addition quantity is excessive, the ESR might be increased. Thus, it is preferably added at an amount of 10 mass % or less, and preferably at an amount of 5 mass % or less. Furthermore, it is preferable when using two or more different systems of these additives, like a combination of an alkoxysilane compound with a glycidyl compound to improve the characteristics.

As explained, the capacitor element is treated with the high boiling point organic solvent with a boiling point of 150° C. or more, or with the solution including the high boiling point organic solvent with a boiling point of 150° C. or more at an amount of 20 mass % or more, and less than 100 mass % (hereinafter, this solution can be called as "intermediate treatment solution.") Here, the capacitor element having formed the conductive polymer is immersed in the intermediate treatment solution above, and then, taken out and dried. Alternatively, the intermediate treatment solution above is sprayed or applied on the capacitor element, and then dried.

EXAMPLES

Next, the present invention is explained more in detail with reference to the Examples, but the construction of the present invention should not be limited to the Examples alone. It is noted that in the Examples, the indication of % for the concentration or content is mass % unless otherwise noted.

First, Examples 1-24 are explained which should be compared with Comparative Examples 1-12. Prior to those explanations for the Examples and Comparative Examples, Preparation Examples 1-10 are explained, that are the preparation examples used in the conductive auxiliary liquids to be used in these Examples. Preparation Examples 11-13 are explained, that are the preparation examples used in the electrolyte liquids to be used in the Comparative Examples. Preparation Examples (I) to (III) are the preparation examples of the conductive polymer dispersion liquids used in e.g., the Examples.

Preparation Example 1

Into 500 g of γ-butyrolactone put in an 1 L beaker with a stirrer, 50 g of hydroxybenzene carboxylic acid, 5 g of nitrophenol and 1 g of 3-glycidoxypropyltrimethoxysilane were added. By stirring them for 24 hours, a conductive auxiliary liquid was prepared.

The conductivity of this conductive auxiliary liquid was measured under a condition of 25° C. by using a conductivity measurement instrument (F-55) manufactured by Horiba, Ltd. The conductivity of this conductive auxiliary liquid was 16 μS/cm.

Here, γ-butyrolactone has a boiling point of 203° C., corresponding to the high boiling point organic solvent with a boiling point of 150° C. or more. Hydroxybenzene carboxylic acid and nitrophenol correspond to the aromatic compound having at least one hydroxyl group. The concentration of the aromatic compound having at least one hydroxyl group in the conductive auxiliary liquid was approximately 9.9%. The ratio of hydroxybenzene carboxylic acid to nitrophenol was 10:1 by mass ratio. In addition, 3-glycidoxypropyltrimethoxysilane corresponds to the binding agent. The concentration of 3-glycidoxypropyltrimethoxysilane in the conductive auxiliary liquid was approximately 0.18%.

Preparation Example 2

Into 500 g of γ-butyrolactone put in an 1 L beaker with a stirrer, 50 g of hydroxybenzene carboxylic acid, 10 g of nitrophenol and 5 g of 3-glycidoxypropyltrimethoxysilane were added. By stirring them for 24 hours, a conductive auxiliary liquid was prepared.

The conductivity of this conductive auxiliary liquid was measured under a condition of 25° C. by using a conductivity measurement instrument (F-55) manufactured by Horiba, Ltd. The conductivity of this conductive auxiliary liquid was 16 μS/cm.

Here, γ-butyrolactone has a boiling point of 203° C., corresponding to the high boiling point organic solvent with a boiling point of 150° C. or more. Hydroxybenzene carboxylic acid and nitrophenol correspond to the aromatic compound having at least one hydroxyl group. The concentration of the aromatic compound having at least one hydroxyl group in the conductive auxiliary liquid was approximately 10.6%. The ratio of hydroxybenzene carboxylic acid to nitrophenol was 5:1 by mass ratio. In addition, 3-glycidoxypropyltrimethoxysilane corresponds to the binding agent. The concentration of 3-glycidoxypropyltrimethoxysilane in the conductive auxiliary liquid was approximately 0.9%.

Preparation Example 3

Into 500 g of ethylene glycol put in an 1 L beaker with a stirrer, 50 g of hydroxybenzene carboxylic acid, 10 g of nitrophenol and 5 g of 3-glycidoxypropyltrimethoxysilane were added. By stirring them for 24 hours, a conductive auxiliary liquid was prepared.

The conductivity of this conductive auxiliary liquid was measured under a condition of 25° C. by using a conductivity measurement instrument (F-55) manufactured by Horiba, Ltd. The conductivity of this conductive auxiliary liquid was 8 μS/cm.

Here, ethylene glycol has a boiling point of 198° C., corresponding to the high boiling point organic solvent with a boiling point of 150° C. or more. Hydroxybenzene carboxylic acid and nitrophenol correspond to the aromatic compound having at least one hydroxyl group. The concentration of the aromatic compound having at least one hydroxyl group in the conductive auxiliary liquid was approximately 10.6%. The ratio of hydroxybenzene carboxylic acid to nitrophenol was 5:1 by mass ratio. In addition, 3-glycidoxypropyltrimethoxysilane corresponds to the binding agent. The concentration of 3-glycidoxypropyltrimethoxysilane in the conductive auxiliary liquid was approximately 0.9%.

Preparation Example 4

Into 500 g of sulfolane put in an 1 L beaker with a stirrer, 50 g of hydroxybenzene carboxylic acid, 10 g of nitrophenol and 5 g of 3-glycidoxypropyltrimethoxysilane were added. By stirring them for 24 hours, a conductive auxiliary liquid was prepared.

The conductivity of this conductive auxiliary liquid was measured under a condition of 25° C. by using a conductivity measurement instrument (F-55) manufactured by Horiba, Ltd. The conductivity of this conductive auxiliary liquid was 12 μS/cm.

Here, sulfolane has a boiling point of 285° C., corresponding to the high boiling point organic solvent with a boiling point of 150° C. or more. Hydroxybenzene carboxylic acid and nitrophenol correspond to the aromatic compound having at least one hydroxyl group. The concentration of the aromatic compound having at least one hydroxyl group in the conductive auxiliary liquid was approximately 10.6%. The ratio of hydroxybenzene carboxylic acid to nitrophenol was 5:1 by mass ratio. In addition, 3-glycidoxypropyltrimethoxysilane corresponds to the binding agent. The concentration of 3-glycidoxypropyltrimethoxysilane in the conductive auxiliary liquid was approximately 0.9%.

Preparation Example 5

Except for changing the amount to add hydroxybenzene carboxylic acid from 50 g to 75 g, the same procedure as Preparation Example 1 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 20 μS/cm.

In Preparation Example 5, γ-butyrolactone was used as the high boiling point organic solvent with a boiling point of 150° C. or more. Hydroxybenzene carboxylic acid and nitrophenol were used as the aromatic compound having at least one hydroxyl group. The concentration of the aromatic compound having at least one hydroxyl group in the conductive auxiliary liquid was approximately 13.8%. The ratio of hydroxybenzene carboxylic acid to nitrophenol was 15:1 by mass ratio. In addition, the concentration of 3-glycidoxypropyltrimethoxysilane, a binding agent, in conductive auxiliary liquid was approximately 0.17%.

Preparation Example 6

Except for changing the amount to add hydroxybenzene carboxylic acid from 50 g to 30 g, the same procedure as Preparation Example 1 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 14 μS/cm.

In Preparation Example 6, γ-butyrolactone was used as the high boiling point organic solvent with a boiling point of 150° C. or more. Hydroxybenzene carboxylic acid and nitrophenol were used as the aromatic compound having at least one hydroxyl group. The concentration of the aromatic compound having at least one hydroxyl group in the conductive auxiliary liquid was approximately 5.7%. The ratio of hydroxybenzene carboxylic acid to nitrophenol was 6:1 by mass ratio. In addition, the concentration of 3-glycidoxypropyltrimethoxysilane, a binding agent, in conductive auxiliary liquid was approximately 0.19%.

Preparation Example 7

Except for further adding 5 g of polyethylene glycol 400, the same procedure as Preparation Example 1 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 16 μS/cm.

Here, polyethylene glycol 400 corresponds to a conductive improver. In Preparation Example 7, γ-butyrolactone was used as the high boiling point organic solvent with a boiling point of 150° C. or more. Hydroxybenzene carboxylic acid and nitrophenol were used as the aromatic compound having at least one hydroxyl group. The concentration of the aromatic compound having at least one hydroxyl group in the conductive auxiliary liquid was approximately 9.8%. The ratio of hydroxybenzene carboxylic acid to nitrophenol was 10:1 by mass ratio. In addition, the concentration of the binding agent, 3-glycidoxypropyltrimethoxysilane in the conductive auxiliary liquid was approximately 0.18%. The concentration of the conductive improver, polyethylene glycol 400 in the conductive auxiliary liquid was approximately 0.89%.

Preparation Example 8

Except for further adding 8 g of dimethylamine, the same procedure as Preparation Example 7 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 530 µS/cm.

Here, the dimethylamine corresponds to a cationic component of the electrolyte. In Preparation Example 8, γ-butyrolactone was used as the high boiling point organic solvent with a boiling point of 150° C. or more. Hydroxybenzene carboxylic acid and nitrophenol were used as the aromatic compound having at least one hydroxyl group. The concentration of the aromatic compound having at least one hydroxyl group in the conductive auxiliary liquid was approximately 9.7%. The ratio of hydroxybenzene carboxylic acid to nitrophenol was 10:1 by mass ratio. In addition, the concentration of the binding agent, 3-glycidoxypropyltrimethoxysilane in the conductive auxiliary liquid was approximately 0.18%. The concentration of the conductive improver, polyethylene glycol 400 in the conductive auxiliary liquid was approximately 0.88%. The concentration of the dimethylamine in the conductive auxiliary liquid was approximately 1.4%.

Preparation Example 9

Except for further adding 5 g of glycerin, the same procedure as Preparation Example 1 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 16 µS/cm.

Here, the glycerin above corresponds to a heat resistance improver. In Preparation Example 9, γ-butyrolactone was used as the high boiling point organic solvent with a boiling point of 150° C. or more. Hydroxybenzene carboxylic acid and nitrophenol were used as the aromatic compound having at least one hydroxyl group. The concentration of the aromatic compound having at least one hydroxyl group in the conductive auxiliary liquid was approximately 8.8%. The ratio of hydroxybenzene carboxylic acid to nitrophenol was 10:1 by mass ratio. In addition, the concentration of the binding agent, 3-glycidoxypropyltrimethoxysilane in the conductive auxiliary liquid was approximately 0.17%. The concentration of the heat resistance improver, glycerin in the conductive auxiliary liquid was approximately 0.89%.

Preparation Example 10

Except for further adding 3 g of hydroxyethyl acrylate, the same procedure as Preparation Example 1 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 18 µS/cm.

Here, the hydroxyethyl acrylate above corresponds to a heat resistance improver. In Preparation Example 10, γ-butyrolactone was used as the high boiling point organic solvent with a boiling point of 150° C. or more. Hydroxybenzene carboxylic acid and nitrophenol were used as the aromatic compound having at least one hydroxyl group. The concentration of the aromatic compound having at least one hydroxyl group in the conductive auxiliary liquid was approximately 9.8%. The ratio of hydroxybenzene carboxylic acid to nitrophenol was 10:1 by mass ratio. In addition, the concentration of the binding agent, 3-glycidoxypropyltrimethoxysilane in the conductive auxiliary liquid was approximately 0.18%. The concentration of the hydroxyethyl acrylate above in the conductive auxiliary liquid was 0.5%.

Preparation Example 11 (For Comparative Examples)

Into 500 g of γ-butyrolactone put in an 1 L beaker with a stirrer, 50 g of ammonium adipate were added. Then, by stirring them for 24 hours, an electrolyte liquid was prepared.

The conductivity of this electrolyte liquid was measured under a condition of 25° C. by using a conductivity measurement instrument (F-55) manufactured by Horiba, Ltd. The conductivity of this electrolyte liquid was 3.0 mS/cm.

Preparation Example 12 (For Comparative Examples)

Except for further adding 5 g of glycerin, the same procedure as Preparation Example 11 was carried out to prepare an electrolyte liquid.

The conductivity of this electrolyte liquid was measured under a condition of 25° C. by using a conductivity measurement instrument (F-55) manufactured by Horiba, Ltd. The conductivity of this electrolyte liquid was 3.3 mS/cm.

Preparation Example 13 (For Comparative Examples)

Except for further adding 5 g of 3-glycidoxypropyltrimethoxysilane, the same procedure as Preparation Example 11 was carried out to prepare an electrolyte liquid.

The conductivity of this electrolyte liquid was measured under a condition of 25° C. by using a conductivity measurement instrument (F-55) manufactured by Horiba, Ltd. The conductivity of this electrolyte liquid was 3.3 mS/cm.

Preparation Example of Conductive Polymer Dispersion Liquid (I)

600 g of 3% aqueous solution of polystyrene sulfonic acid manufactured by Tayca Corporation (having a weight average molecular weight of 100,000) was put in a stainless steel container with an internal volume of 1 L, into which 0.3 g of ferrous sulfate with 7 hydrates was added. Then, 4 mL of 3,4-ethylenedioxythiophene was gradually dropped therein.

They were stirred by the stirrer blade made of stainless steel, and a positive electrode was attached to the container, and a negative electrode was attached to the base of the stirrer blade. A constant current of 1 mA/cm2 was applied to carry out an electrolytic oxidation polymerization for 18 hours. After the electrolytic oxidation polymerization above, the mixture was diluted with 6 times of water. Then, a dispersion treatment was carried out by using an ultrasonic homogenizer [Nippon Seiki Co., Ltd., US-T300 (commercial name)] for two hours. Then, 100 g of cation exchange resin [AMBERLITE 120B (commercial name)] manufactured by Organo Corporation was added, and the mixture was stirred for one hour. Then, the mixture was filtered with filter paper No. 131 manufactured by Toyo Roshi Kaisha, Ltd. The treatment by the cation exchange resin and the filtration was repeated three times to remove all the cationic components, such as iron ions, in the liquid.

Thereby treated liquid was filtered with a filter having a pore size of 1 μm. Thereby filtered liquid was treated with an ultrafiltration device [VIVAFLOW 200 (product name) made by Sartorius Corporation, in a condition of a molecular weight fraction of 50,000], to remove free components of low molecular weights in the liquid. The liquid after the process above was diluted with water to adjust its concentration at 2%. Then, using 28% ammonia aqueous solution, its pH was adjusted into 3. Then, with respect to 40 g of the solution above, 4 g of ethylene glycol was added to obtain a conductive polymer dispersion liquid (I).

Preparation Example of Conductive Polymer Dispersion Liquid (I)

40 g of the conductive polymer dispersion liquid (I) prepared in Preparation Example (I) of conductive polymer dispersion liquid was put into a beaker with a stirrer. With stirring, 0.2 g of hydroxybenzene carboxylic acid was added. However, even continuing the stirring for a few days, the hydroxybenzene carboxylic acid did not dissolve.

Preparation Example of Conductive Polymer Dispersion Liquid (III)

40 g of the conductive polymer dispersion liquid (I) prepared in Preparation Example (I) of conductive polymer dispersion liquid was put into a beaker with a stirrer. With stirring, 0.2 g of nitrophenol was added. However, even continuing the stirring for a few days, the nitrophenol did not dissolve.

Example 1

A surface of an aluminum foil was applied to an etching treatment. Then, a conversion treatment was applied thereto to form a positive electrode having a dielectric layer of an oxide layer of aluminum, to which a lead terminal was attached. Also, a lead terminal was attached to a negative electrode made of an aluminum foil. These positive electrode and negative electrode having lead terminals were wound with an intervention of a separator to manufacture a capacitor element. This capacitor element was set to have an ESR of 15 mΩ or less, a capacitance of 50 μF or more, and a break voltage (voltage resistance) of 100V or more.

The capacitor element above was immersed in the conductive polymer dispersion liquid (I), which was prepared in Preparation Example (I) of conductive polymer dispersion liquid. 5 minutes later, it was taken out and dried at 150° C. for 30 minutes. The steps above were repeated twice to provide a conductive polymer on the dielectric layer of the capacitor element.

Then, the capacitor element provided with the conductive polymer above was immersed in the conductive auxiliary liquid prepared in Preparation Example 1, to impregnate the capacitor element with the conductive auxiliary liquid. Five minutes later, it was taken out. A package was provided from an exterior material to produce a winding-type aluminum electrolyte capacitors.

Examples 2-10 and Comparative Examples 1-3

The conductive auxiliary liquid prepared in Preparation Example 1 was replaced with the conductive auxiliary liquids prepared in Preparation Examples 2-10, and the electrolyte liquids prepared in Preparation Examples 11-13, respectively. Other than the replacement above, the same procedure as Example 1 was carried out to produce winding-type aluminum electrolyte capacitors.

Comparative Example 4

The conductive auxiliary liquid was not impregnated. Other than such change, the same procedure as Example 1 was performed to obtain a winding-type aluminum solid electrolyte capacitor.

With respect to the winding-type aluminum electrolyte capacitors of Examples 1 to 10 and Comparative Examples 1 to 4 as produced above, the ESR and the capacitance were measured, as well as the leakage current was measured. The results are shown in Table 1, along with the kinds of the conductive auxiliary liquids or the electrolyte liquids used. The explanations below are the measuring methods of the ESR, the capacitance and the leakage current.

ESR:
Using an LCR meter (4,284 A) made by HEWLETT PACKARD Corporation, it was measured at 100 kHz at a condition of 25° C.
Capacitance:
Using an LCR meter (4,284 A) made by HEWLETT PACKARD Corporation, it was measured at 120 Hz at a condition of 25° C.
Leakage Current:
A voltage of 63V was applied to the winding-type aluminum electrolyte capacitor at 25° C. for 60 seconds. Then, a leakage current was measured with a digital oscilloscope.

In the measurement, twenty samples of each Example was used. The values of ESR, capacitance and leakage current, shown in Table 1, were obtained by averaging the results of the twenty samples while rounding off the number of the second decimal place. In addition, the kinds of the conductive auxiliary liquid or the electrolyte liquid are shown by the number of the Preparation Example. In Table 1, for the purpose of saving the space, "the kind of the conductive auxiliary liquid or the electrolyte liquid" mentioned above is simply shown as "the kind of the liquid."

TABLE 1

| | Liquid Type | ESR (mΩ) | Capacitance (μF) | Leak current (μA) |
|---|---|---|---|---|
| Example 1 | Preparation Example 1 | 11.5 | 58.3 | 1.9 |
| Example 2 | Preparation Example 2 | 11.9 | 59.2 | 2.0 |
| Example 3 | Preparation Example 3 | 11.1 | 58.2 | 1.1 |
| Example 4 | Preparation Example 4 | 11.9 | 58.9 | 1.3 |

TABLE 1-continued

|  | Liquid Type | ESR (mΩ) | Capacitance (μF) | Leak current (μA) |
|---|---|---|---|---|
| Example 5 | Preparation Example 5 | 12.2 | 59.1 | 1.5 |
| Example 6 | Preparation Example 6 | 12.4 | 58.8 | 1.4 |
| Example 7 | Preparation Example 7 | 11.4 | 59.1 | 1.1 |
| Example 8 | Preparation Example 8 | 13.3 | 58.4 | 1.3 |
| Example 9 | Preparation Example 9 | 11.8 | 59.0 | 1.1 |
| Example 10 | Preparation Example 10 | 11.5 | 59.2 | 1.0 |
| Comparative Example 1 | Preparation Example 11 | 21.8 | 58.8 | 1.5 |
| Comparative Example 2 | Preparation Example 12 | 22.0 | 58.5 | 1.4 |
| Comparative Example 3 | Preparation Example 13 | 22.6 | 58.2 | 2.1 |
| Comparative Example 4 | — | 17.9 | 51.5 | 4.3 |

In addition, after the measurements of the characteristics above, the winding-type aluminum electrolyte capacitors of Examples 1 to 10 and Comparative Examples 1 to 4 (ten samples for each Example) were still left in a dryer at 260° C. for three minutes. On the capacitors after the storage, the ESR, the capacitance and the leakage current as well as the break voltage were measured in the same manner before. The results are shown in Table 2. Here, the break voltage was measured by using PRK650-2.5 manufactured by Matsusada Precision Inc. At a condition of 25° C., the voltage was raised at a speed of 1V/s to measure the voltage when the break occurred.

In the measurement, ten samples of each Example was used. The values of ESR, capacitance and leakage current, shown in Table 2, were obtained by averaging the results of the ten samples while rounding off the number of the second decimal place. In addition, the values of the break voltage were obtained by averaging the results of the ten samples, while rounding off the number of the decimal place.

TABLE 2

|  | ESR (mΩ) | Capacitance (μF) | Leak current (μA) | Break voltage (V) |
|---|---|---|---|---|
| Example 1 | 11.6 | 58.3 | 1.8 | 118 |
| Example 2 | 11.8 | 59.2 | 1.9 | 118 |
| Example 3 | 11.2 | 58.2 | 1.0 | 119 |
| Example 4 | 11.8 | 58.7 | 1.6 | 118 |
| Example 5 | 12.2 | 59.0 | 1.7 | 119 |
| Example 6 | 12.4 | 58.5 | 1.2 | 118 |
| Example 7 | 11.3 | 59.2 | 1.1 | 119 |
| Example 8 | 13.9 | 58.0 | 1.1 | 119 |
| Example 9 | 11.6 | 59.0 | 1.1 | 119 |
| Example 10 | 11.4 | 59.1 | 1.1 | 119 |
| Comparative Example 1 | 29.9 | 58.1 | 14.4 | 98 |
| Comparative Example 2 | 24.5 | 58.3 | 1.4 | 108 |
| Comparative Example 3 | 25.6 | 58.1 | 2.1 | 118 |
| Comparative Example 4 | 18.6 | 49.8 | 8.3 | 92 |

In addition, after the measurements of the characteristics as shown in Table 1 above, the winding-type aluminum electrolyte capacitors of Examples 1-10 and Comparative Examples 1-4 (other ten samples for each Example) were still left in a dryer at 150° C. for 250 hours. On the capacitors after the storage, the ESR, the capacitance and the leakage current were measured in the same manner as before. The results are shown in Table 3 in the same manner as Table 2.

TABLE 3

|  | ESR (mΩ) | Capacitance (μF) | Leak current (μA) |
|---|---|---|---|
| Example 1 | 12.0 | 58.1 | 1.6 |
| Example 2 | 12.3 | 59.0 | 1.6 |
| Example 3 | 11.8 | 58.1 | 1.0 |
| Example 4 | 12.2 | 58.4 | 1.4 |
| Example 5 | 12.7 | 58.8 | 1.4 |
| Example 6 | 12.9 | 58.4 | 1.1 |
| Example 7 | 11.5 | 59.1 | 0.9 |
| Example 8 | 14.4 | 57.9 | 1.9 |
| Example 9 | 11.6 | 59.0 | 1.1 |
| Example 10 | 11.8 | 59.1 | 1.1 |
| Comparative Example 1 | 899.9 | 58.0 | 9.4 |
| Comparative Example 2 | 673.4 | 57.9 | 4.8 |
| Comparative Example 3 | 794.2 | 58.0 | 3.8 |
| Comparative Example 4 | 23.6 | 48.5 | 19.3 |

As shown in Table 1, the winding-type aluminum electrolyte capacitors of Example 1-10 (hereinafter, the "winding-type aluminum electrolyte capacitor" can be simply called as "capacitor") accomplished the following features. The ESR was 11.1-13.3 mΩ, satisfying the set ESR of 15 mΩ or less. The capacitance was 58.2-59.2 μF, satisfying the set capacitance of 50 μF or more. In addition, the ESR was lower (smaller) than the capacitors of Comparative Example 1-3. Also, the capacitance and the leakage current were in the same level as the capacitors of Comparative Example 1-3, and therefore, there were found no significant deteriorations in the characteristics while accomplishing lower ESR.

Namely, the capacitors of Examples 1-10 used the conductive auxiliary liquid with a lower conductivity than an electrolyte liquid together with a conductive polymer. They had a lower ESR than the capacitors of Comparative Examples 1-3 using an electrolyte liquid together with a conductive polymer.

The capacitor of Comparative Example 4 was not impregnated with the conductive auxiliary liquid. It had a higher (larger) ESR, a smaller capacitance and a larger leakage current than the capacitors of Examples 1-10.

Also, as shown it Table 2, even after the storage at a high temperature of 260° C. for three minutes, the capacitors of Examples 1-10 had the following features. The break voltage was 118-119V, satisfying the set break voltage of 100V or more. The ESR was lower than that of the capacitors of Comparative Examples 1-3. Furthermore, as shown in Table 3, even after the storage at 150° C. for 250 hours, the capacitors of Examples 1-10 had lower ESR than the capacitors of Comparative Examples 1-3. In particular, the capacitors of Comparative Examples 1-3 using the electrolyte liquid showed a larger increase of ESR after the storage at 150° C. for 250 hours, and inferior in the heat resistance, compared with the capacitor of Examples 1-10. In other words, in view of the heat resistance, the capacitors of Examples 1-10 using the conductive auxiliary liquid with a low conductivity were superior to the capacitors of Comparative Example 1-3 using the electrolyte liquid.

Also, regarding the break voltage (voltage resistance), as shown in Table 2, the capacitors of Examples 1-10 were significantly superior to the capacitors of Comparative Examples 1, 2 and 4. Also, they were in the same level as the capacitor of Comparative Example 3. Therefore, there was found no characteristic deterioration regarding the break voltage.

Example 11

A surface of an aluminum foil was applied to an etching treatment. Then, A conversion treatment was applied thereto to form a positive electrode having a dielectric layer of an oxide layer of aluminum, to which a lead terminal was attached. Also, a lead terminal was attached to a negative electrode made of an aluminum foil. These positive electrode and negative electrode having lead terminals were wound with an intervention of a separator to manufacture a capacitor element. This capacitor element was set to have an ESR of 15 mΩ or less, a capacitance of 50 μF or more, and a break voltage (voltage resistance) of 100V or more.

Then, there was provided a solution prepared by mixing a monomer solution and an ethanol solution below at mass ratio at 1:4; the monomer solution above was prepared by mixing butylated ethylenedioxythiophene and 3,4-ethylenedioxythiophene at a mass ratio of 80:20; and the ethanol solution was of ferric p-toluenesulfonate at a concentration of 60% (TAYCATRON AF60E, commercial name, manufactured by Tayca Co., Ltd.). Into the solution, the capacitor element was immersed. One minute later, it was taken out to carry out chemical oxidation polymerization at 50° C. for one hour. Then, the capacitor element was immersed in 2% methanol solution of p-toluenesulfonic acid for ten minutes for washing. Then, it was immersed in pure water for washing for five minutes, and then, it was dried by a dryer at 105° C. for 30 minutes.

In this way, the capacitor element had formed the conductive polymer on the dielectric layer of the aluminum foil by so-called "on-site polymerization" (here, the conductive polymer may attach to the portion other than that). It was then immersed in the conductive auxiliary liquid prepared in Preparation Example 1. Then, the capacitor element was impregnated with the conductive auxiliary liquid. Five minutes later, it was taken out. A package was provided from an exterior material to produce a winding-type aluminum electrolyte capacitors.

Examples 12-17 and Comparative Examples 5-7

The conductive auxiliary liquid prepared in Preparation Example 1 was replaced with the conductive auxiliary liquids prepared in Preparation Examples 2-7, and the electrolyte liquids prepared in Preparation Examples 11-13, respectively. Other than the replacement above, the same procedure as Example 11 was carried out to produce winding-type aluminum electrolyte capacitors.

Comparative Example 8

The conductive auxiliary liquid was not impregnated. Other than such change, the same procedure as Example 11 was performed to obtain a laminated-type aluminum solid electrolyte capacitor.

Regarding the winding-type aluminum electrolyte capacitors of Examples 11-17 and Comparative Examples 5-8 (hereinafter, the "winding-type aluminum electrolyte capacitor" can be simply called as "capacitor"), the ESR, the capacitance and the leakage current were measured in the same manner as before. The results are shown in Table 4 in the same manner as Table 1.

TABLE 4

| | Liquid Type | ESR (mΩ) | Capacitance (μF) | Leak current (μA) |
| --- | --- | --- | --- | --- |
| Example 11 | Preparation Example 1 | 12.5 | 59.1 | 7.9 |
| Example 12 | Preparation Example 2 | 12.9 | 59.0 | 5.6 |
| Example 13 | Preparation Example 3 | 12.1 | 59.2 | 5.9 |
| Example 14 | Preparation Example 4 | 12.9 | 59.0 | 8.2 |
| Example 15 | Preparation Example 5 | 13.2 | 59.0 | 5.9 |
| Example 16 | Preparation Example 6 | 13.4 | 59.1 | 7.2 |
| Example 17 | Preparation Example 7 | 12.4 | 59.0 | 6.3 |
| Comparative Example 5 | Preparation Example 11 | 33.2 | 59.0 | 19.2 |
| Comparative Example 6 | Preparation Example 12 | 34.5 | 59.1 | 18.5 |
| Comparative Example 7 | Preparation Example 13 | 34.6 | 59.0 | 23.4 |
| Comparative Example 8 | — | 51.9 | 42.5 | 78.5 |

In addition, after the measurements of the characteristics above, the capacitors of Examples 11-17 and Comparative Examples 5-8 (ten samples for each Example) were still left in a dryer at 260° C. for three minutes. On the capacitors after the storage, the ESR, the capacitance and the leakage current as well as the break voltage were measured in the same manner before. The results are shown in Table 5 in the same manner as Table 2.

TABLE 5

| | ESR (mΩ) | Capacitance (μF) | Leak current (μA) | Break voltage (V) |
| --- | --- | --- | --- | --- |
| Example 11 | 12.9 | 59.0 | 9.8 | 110 |
| Example 12 | 13.3 | 59.0 | 9.1 | 109 |
| Example 13 | 12.5 | 59.2 | 8.3 | 110 |
| Example 14 | 13.3 | 59.0 | 9.9 | 108 |
| Example 15 | 13.5 | 59.0 | 5.7 | 109 |
| Example 16 | 13.8 | 59.1 | 8.2 | 110 |
| Example 17 | 12.8 | 59.0 | 6.4 | 116 |
| Comparative Example 5 | 60.1 | 59.0 | 32.2 | 88 |
| Comparative Example 6 | 72.2 | 59.1 | 27.4 | 105 |
| Comparative Example 7 | 66.6 | 59.0 | 31.4 | 110 |
| Comparative Example 8 | 91.9 | 38.4 | 128.2 | 81 |

In addition, after the measurements of the characteristics as shown in Table 4 above, the capacitors of Examples 11-17 and Comparative Examples 5-8 (other ten samples for each Example) were still left in a dryer at 150° C. for 250 hours. On the capacitors after the storage, the ESR, the capacitance and the leakage current were measured in the same manner as before. The results are shown in Table 6 in the same manner as Table 3.

TABLE 6

| | ESR (mΩ) | Capacitance (μF) | Leak current (μA) |
| --- | --- | --- | --- |
| Example 11 | 13.4 | 58.8 | 6.3 |
| Example 12 | 13.8 | 58.7 | 6.9 |
| Example 13 | 12.9 | 59.0 | 7.4 |

TABLE 6-continued

|  | ESR (mΩ) | Capacitance (μF) | Leak current (μA) |
|---|---|---|---|
| Example 14 | 13.7 | 58.8 | 6.9 |
| Example 15 | 13.9 | 58.9 | 4.8 |
| Example 16 | 14.3 | 59.0 | 7.6 |
| Example 17 | 13.2 | 58.8 | 5.5 |
| Comparative Example 5 | 188.9 | 58.9 | 25.1 |
| Comparative Example 6 | 327.3 | 59.0 | 24.6 |
| Comparative Example 7 | 345.7 | 58.8 | 29.1 |
| Comparative Example 8 | 832.2 | 27.5 | 79.1 |

As shown in Table 4, the capacitors of Example 11-17 accomplished the following features. The ESR was 12.1-13.4 mΩ, satisfying the set ESR of 15 mΩ or less. The capacitance was 59.0-59.2 μF, satisfying the set capacitance of 50 μF or more. In addition, the ESR was lower than the capacitors of Comparative Example 5-7.

Namely, among the capacitors of Example 11-17 and Comparative Example 5-7, the following features can be found. The capacitors of Examples 11-17 used the conductive auxiliary liquid with a lower conductivity than an electrolyte liquid together with a conductive polymer. They had a lower ESR than the capacitors of Comparative Examples 5-7 using an electrolyte liquid together with a conductive polymer.

The capacitor of Comparative Example 8 was not impregnated with the conductive auxiliary liquid. It had a higher (larger) ESR, a smaller capacitance and a larger leakage current than the capacitors of Examples 11-17.

Also, as shown in Table 5, even after the storage at a high temperature of 260° C. for three minutes, the capacitors of Examples 11-17 had the following features. The break voltage was 108-116V, satisfying the set break voltage of 100V or more. The ESR was lower than that of the capacitors of Comparative Examples 5-7. Furthermore, as shown in Table 6, even after the storage at 150° C. for 250 hours, the capacitors of Examples 11-17 had lower ESR than the capacitors of Comparative Examples 5-7. In particular, after storage at 150° C. for 250 hours, the capacitors of Comparative Example 5-7 using the electrolyte liquid showed a larger increase of ESR than the capacitors of Example 11-17, and therefore, they were inferior in the heat resistance. In other words, in view of the heat resistance, the capacitors of Examples 11-17 using the conductive auxiliary liquid with a low conductivity were superior to the capacitors of Comparative Example 5-7 using the electrolyte liquid.

Also, regarding the break voltage (voltage resistance), as shown in Table 5, the capacitors of Examples 11-17 were significantly superior to the capacitors of Comparative Examples 5, 6 and 8. Also, they were in the same level as the capacitor of Comparative Example 7. Therefore, there was found no characteristic deterioration regarding the break voltage.

Example 18

The same operation as Example 11 was carried out. In the same manner as Example 11, a capacitor element was produced to have a set ESR of 15 mΩ or less, a set capacitance of 50 μF or more, and a set break voltage of 100V or more.

Then, into a vial with an airtight stopper were put 3.58 ml of a solution in which 50% phenolsulfonic acid was adjusted with butylamine to become a pH of 6; 3.58 ml of 45% ammonium persulfate aqueous solution; 0.26 ml of 35% dimethyllaurylamine oxide aqueous solution; and a monomer solution in which butylated ethylenedioxythiophene, propylated ethylenedioxythiophene and 3,4-ethylenedioxythiophene were mixed at a mass ratio of 40:40:20. After mixing them for ten minutes, the capacitor element was quickly immersed in the mixture. After one minute, it was taken out, and chemical oxidation polymerization was carried out at room temperature for 90 minutes. Then, the capacitor element was immersed in 2% methanol solution of p-toluenesulfonic acid for ten minutes for washing. Then, it was immersed in pure water for washing for five minutes, and then, it was dried by a dryer at 105° C. for 30 minutes.

In this way, the capacitor element had formed the conductive polymer on the dielectric layer of the aluminum foil by so-called "on-site polymerization" (here, the conductive polymer may attach to the portion other than that). It was then immersed in the conductive auxiliary liquid prepared in Preparation Example 1. Then, the capacitor element was impregnated with the conductive auxiliary liquid. Five minutes later, it was taken out. A package was provided from an exterior material to produce a winding-type aluminum electrolyte capacitors.

Examples 19-24 and Comparative Examples 9-11

The conductive auxiliary liquid prepared in Preparation Example 1 was replaced with the conductive auxiliary liquids prepared in Preparation Examples 2-7, and the electrolyte liquids prepared in Preparation Examples 11-13, respectively. Other than the replacement above, the same procedure as Example 18 was carried out to produce winding-type aluminum electrolyte capacitors.

Comparative Example 12

The conductive auxiliary liquid was not impregnated. Other than such change, the same procedure as Example 18 was performed to obtain a laminated-type aluminum solid electrolyte capacitor.

Regarding the winding-type aluminum electrolyte capacitors of Examples 18-24 and Comparative Examples 9-12 (hereinafter, the "winding-type aluminum electrolyte capacitor" can be simply called as "capacitor"), the ESR, the capacitance and the leakage current were measured in the same manner as before. The results are shown in Table 7 in the same manner as Table 1.

TABLE 7

|  | Liquid Type | ESR (mΩ) | Capacitance (μF) | Leak current (μA) |
|---|---|---|---|---|
| Example 18 | Preparation Example 1 | 12.2 | 59.0 | 5.9 |
| Example 19 | Preparation Example 2 | 12.8 | 59.1 | 5.4 |
| Example 20 | Preparation Example 3 | 12.2 | 59.0 | 6.1 |
| Example 21 | Preparation Example 4 | 12.5 | 59.2 | 5.8 |
| Example 22 | Preparation Example 5 | 13.0 | 59.0 | 6.0 |

TABLE 7-continued

| | Liquid Type | ESR (mΩ) | Capacitance (μF) | Leak current (μA) |
|---|---|---|---|---|
| Example 23 | Preparation Example 6 | 13.3 | 59.0 | 6.1 |
| Example 24 | Preparation Example 7 | 12.0 | 59.2 | 5.1 |
| Comparative Example 9 | Preparation Example 11 | 34.3 | 59.0 | 13.2 |
| Comparative Example 10 | Preparation Example 12 | 35.9 | 59.1 | 14.4 |
| Comparative Example 11 | Preparation Example 13 | 36.2 | 59.0 | 26.1 |
| Comparative Example 12 | — | 54.4 | 41.1 | 60.2 |

In addition, after the measurements of the characteristics above, the capacitors of Examples 18-24 and Comparative Examples 9-12 (ten samples for each Example) were still left in a dryer at 260° C. for three minutes. On the capacitors after the storage, the ESR, the capacitance and the leakage current as well as the break voltage were measured in the same manner before. The results are shown in Table 8 in the same manner as Table 2.

TABLE 8

| | ESR (mΩ) | Capacitance (μF) | Leak current (μA) | Break voltage (V) |
|---|---|---|---|---|
| Example 18 | 12.4 | 59.0 | 5.2 | 116 |
| Example 19 | 12.9 | 59.1 | 5.0 | 117 |
| Example 20 | 12.5 | 59.0 | 4.9 | 116 |
| Example 21 | 12.7 | 59.1 | 5.6 | 116 |
| Example 22 | 13.7 | 59.1 | 6.2 | 117 |
| Example 23 | 13.9 | 59.1 | 6.3 | 115 |
| Example 24 | 12.1 | 59.2 | 4.9 | 120 |
| Comparative Example 9 | 73.3 | 59.0 | 32.2 | 88 |
| Comparative Example 10 | 88.8 | 59.1 | 27.4 | 103 |
| Comparative Example 11 | 75.2 | 59.0 | 31.4 | 111 |
| Comparative Example 12 | 103.9 | 35.0 | 128.2 | 71 |

In addition, after the measurements of the characteristics as shown in Table 7 above, the capacitors of Examples 18-24 and Comparative Examples 9-12 (other ten samples for each Example) were still left in a dryer at 150° C. for 250 hours. On the capacitors after the storage, the ESR, the capacitance and the leakage current were measured in the same manner as before. The results are shown in Table 9 in the same manner as Table 3.

TABLE 9

| | ESR (mΩ) | Capacitance (μF) | Leak current (μA) |
|---|---|---|---|
| Example 18 | 12.8 | 58.8 | 5.9 |
| Example 19 | 13.3 | 58.9 | 5.1 |
| Example 20 | 12.9 | 58.8 | 5.2 |
| Example 21 | 13.1 | 59.0 | 4.9 |
| Example 22 | 14.1 | 59.0 | 5.5 |
| Example 23 | 14.3 | 59.0 | 5.4 |
| Example 24 | 12.3 | 59.0 | 3.2 |
| Comparative Example 9 | 233.6 | 58.8 | 28.1 |
| Comparative Example 10 | 461.1 | 58.7 | 19.4 |
| Comparative Example 11 | 384.7 | 58.7 | 22.0 |

TABLE 9-continued

| | ESR (mΩ) | Capacitance (μF) | Leak current (μA) |
|---|---|---|---|
| Comparative Example 12 | 384.7 | 25.9 | 82.6 |

As shown in Table 7, the capacitors of Example 18-24 accomplished the following features. The ESR was 12.0-13.3 mΩ, satisfying the set ESR of 15 mΩ or less. The capacitance was 59.0-59.2 μF, satisfying the set capacitance of 50 μF or more. In addition, the ESR was lower than the capacitors of Comparative Example 9-11.

Namely, among the capacitors of Example 18-24 and Comparative Example 9-11, the following features can be found. The capacitors of Examples 18-24 used the conductive auxiliary liquid with a lower conductivity than an electrolyte liquid together with a conductive polymer. They had a lower ESR than the capacitors of Comparative Examples 9-11 using an electrolyte liquid together with a conductive polymer.

The capacitor of Comparative Example 12 was not impregnated with the conductive auxiliary liquid. It had a higher (larger) ESR, a smaller capacitance and a larger leakage current than the capacitors of Examples 18-24.

Also, as shown in Table 8, even after the storage at a high temperature of 260° C. for three minutes, the capacitors of Examples 18-24 had the following features. The break voltage was 115-120V, satisfying the set break voltage of 100V or more. The ESR was lower than that of the capacitors of Comparative Examples 9-11. Furthermore, as shown in Table 9, even after the storage at 150° C. for 250 hours, the capacitors of Examples 18-24 had lower ESR than the capacitors of Comparative Examples 9-11. In particular, after storage at 150° C. for 250 hours, the capacitors of Comparative Example 9-11 using the electrolyte liquid showed a larger increase of ESR than the capacitors of Example 18-24, and therefore, they were inferior in the heat resistance. In other words, in view of the heat resistance, the capacitors of Examples 18-24 using the conductive auxiliary liquid with a low conductivity were superior to the capacitors of Comparative Example 9-11 using the electrolyte liquid.

Also, regarding the break voltage (voltage resistance), as shown in Table 8, the capacitors of Examples 18-24 were significantly superior to the capacitors of Comparative Examples 9-12. There was found no characteristic deterioration regarding the break voltage.

Next, Examples 25-47 are explained. Before such explanation, explained first are Preparation Examples of the conductive auxiliary liquids and the conductive polymer dispersion liquids to be used in the Examples.

Preparation Example 14

Except for further adding 20 g of butyl hydroxybenzene carboxylate, the same procedure as Preparation Example 1 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 16 μS/cm.

Preparation Example 15

Except for further adding 10 g of methacrylic acid and 10 g of glycidyl methacrylate, the same procedure as Preparation Example 3 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 9 µS/cm.

Preparation Example 16

Except for further adding 20 g of acrylic acid, the same procedure as Preparation Example 3 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 10 µS/cm.

Preparation Example 17

Except for further adding 20 g of ethyl hydroxybenzene carboxylate, the same procedure as Preparation Example 8 was carried out to prepare a conductive auxiliary liquid.

The conductivity of this conductive auxiliary liquid was measured under a condition of 25° C. by using a conductivity measurement instrument (F-55) manufactured by Horiba, Ltd. The conductivity of this conductive auxiliary liquid was 540 µS/cm.

Preparation Example of Conductive Polymer Dispersion Liquid (IV)

1 L of pure water was added in a separable flask with a stirrer with a volume of 2 L, into which 190 g of sodium styrenesulfonate (170 g of the styrenesulfonic acid basis) and 10 g of hydroxyethyl acrylate were added. Then, 1 g of ammonium persulfate as an oxidant was added into the solution. There, polymerization reaction of styrenesulfonic acid and hydroxyethyl acrylate was conducted for 12 hours.

Then, the reaction liquid was treated with an ultrafiltration device [VIVAFLOW 200 (product name) made by Sartorius Corporation, in a condition of a molecular weight fraction of 50,000], to remove free components of low molecular weights in the liquid. Then, the concentration was adjusted into 3%, thereby obtaining 3% aqueous solution of a copolymer of styrenesulfonic acid and hydroxyethyl acrylate.

With respect to the copolymer of styrenesulfonic acid and hydroxyethyl acrylate as obtained above, using a gel filtration column, the weight average molecular weight was estimated as 150,000 based on dextran as a authentic preparation.

Then, the 3% of the polystyrene sulfonic acid aqueous solution in the conductive polymer dispersion liquid (I) was replaced with the 3% of the copolymer aqueous solution of styrenesulfonic acid and hydroxyethyl acrylate as mentioned above. Other than the replacement above, the same procedure as Preparation Example (I) was carried out, thereby obtaining 2% of a conductive polymer dispersion liquid. Into the 2% of the conductive polymer dispersion liquid, 28% ammonia aqueous solution was added to adjust its pH into 3, thereby obtaining a conductive polymer dispersion liquid (IV). The particle size distribution of the conductive polymer in the conductive polymer dispersion liquid (IV) was measured by using ELS-Z manufactured by Otsuka Electronics Co., Ltd., thereby finding that the average particle size was 130 nm.

Example 25

The conductive auxiliary liquid prepared in Preparation Example 1 was replaced with the conductive auxiliary liquid prepared in Preparation Example 14. Other than the replacement above, the same procedure as Example 1 was carried out to produce winding-type aluminum electrolyte capacitors.

Example 26

The conductive auxiliary liquid prepared in Preparation Example 1 was replaced with the conductive auxiliary liquid prepared in Preparation Example 15. Other than the replacement above, the same procedure as Example 1 was carried out to produce winding-type aluminum electrolyte capacitors.

Example 27

The conductive auxiliary liquid prepared in Preparation Example 1 was replaced with the conductive auxiliary liquid prepared in Preparation Example 16. Other than the replacement above, the same procedure as Example 1 was carried out to produce winding-type aluminum electrolyte capacitors.

Example 28

The conductive auxiliary liquid prepared in Preparation Example 1 was replaced with the conductive auxiliary liquid prepared in Preparation Example 17. Other than the replacement above, the same procedure as Example 1 was carried out to produce winding-type aluminum electrolyte capacitors.

Example 29

The conductive polymer dispersion liquid (I) prepared in Preparation Example (I) of conductive polymer dispersion liquid was replaced with the conductive polymer dispersion liquid (IV) prepared in Preparation Example (IV) of conductive polymer dispersion liquid. Other than the replacement above, the same procedure as Example 1 was carried out to produce a winding-type aluminum electrolyte capacitor.

Example 30

The conductive polymer dispersion liquid (I) prepared in Preparation Example (I) of conductive polymer dispersion liquid was replaced with the dispersion liquid (IV) of the conductive dispersion liquid prepared in Preparation Example (IV) of conductive polymer dispersion liquid. Other than the replacement above, the same procedure as Example 3 was carried out to produce a winding-type aluminum electrolyte capacitor.

Example 31

The conductive polymer dispersion liquid (I) prepared in Preparation Example (I) of conductive polymer dispersion liquid was replaced with the dispersion liquid (IV) of the conductive dispersion liquid prepared in Preparation Example (IV) of conductive polymer dispersion liquid. Other than the replacement above, the same procedure as Example 8 was carried out to produce a winding-type aluminum electrolyte capacitor.

Example 32

In Example 32 and subsequent Examples 33-37, before providing the conductive polymer on the capacitor element using the conductive polymer dispersion liquid, the capacitor element is subject to pretreatment by using a pretreatment solution. Thus, the preparation of the pretreatment solution (1) to be become the pretreatment solution is explained first.

Preparation Example (1) for the Pretreatment Solution (1)

Into 500 g of ethanol put in an 1 L beaker with a stirrer, 15 g of butyl hydroxybenzene carboxylate and 5 g of 3-glycidoxypropyltrimethoxysilane were added. Then, 5 g of polyethylene glycol 400 was added therein. By stirring them for 24 hours, a pretreatment solution (1) was prepared.

Then, the capacitor element same as used in Example 1 was immersed in the pretreatment solution (1) above. One minute later, it was taken out and dried at 150° C. for 15 minutes to carry out the pretreatment.

Then, the capacitor element treated with the pretreatment solution (1) was immersed in the conductive polymer dispersion liquid (I), which was prepared in Preparation Example (I) of conductive polymer dispersion liquid. 5 minutes later, it was taken out and dried at 150° C. for 30 minutes. The steps above were repeated twice to provide a conductive polymer on the positive electrode of the dielectric layer of the capacitor element.

The capacitor element provided with the conductive polymer above was immersed in the conductive auxiliary liquid prepared in Preparation Example 1, to impregnate the capacitor element with the conductive auxiliary liquid. Five minutes later, it was taken out. A package was provided from an exterior material to produce a winding-type aluminum electrolyte capacitors.

Example 33

In the Preparation Example (1) of the pretreatment solution (1), the 5 g of butyl hydroxybenzene carboxylate was replaced with 2 g of butyl hydroxybenzene carboxylate ester and 3 g of methyl hydroxybenzene carboxylate ester. Other than the replacement above, the same procedure as the Preparation Example (1) of the pretreatment solution (1) was carried out to prepare a pretreatment solution (2). Other than the pretreatment of the capacitor element with the pretreatment solution (2), the same procedure as Example 32 was carried out to produce a winding-type aluminum electrolyte capacitor.

Example 34

In the Preparation Example (1) of the pretreatment solution (1), the 5 g of butyl hydroxybenzene carboxylate was replaced with 4 g of butyl hydroxybenzene carboxylate and 1 g of hydroxybenzene carboxylic acid. Other than the replacement above, the same procedure as the Preparation Example (1) of the pretreatment solution (1) was carried out to prepare a pretreatment solution (3). Other than the pretreatment of the capacitor element with the pretreatment solution (3), the same procedure as Example 32 was carried out to produce a winding-type aluminum electrolyte capacitor.

Example 35

In the Preparation Example (1) of the pretreatment solution (1), the 5 g of butyl hydroxybenzene carboxylate was replaced with 3 g of butyl hydroxybenzene carboxylate, 1 g of ethyl hydroxybenzene carboxylate, and 1 g of hydroxybenzene carboxylic acid. Other than the replacement above, the same procedure as the Preparation Example (1) of the pretreatment solution (1) was carried out to prepare a pretreatment solution (4). Other than the pretreatment of the capacitor element with the pretreatment solution (4), the same procedure as Example 32 was carried out to produce a winding-type aluminum electrolyte capacitor.

Example 36

The conductive polymer dispersion liquid (I) prepared in Preparation Example (I) of conductive polymer dispersion liquid was replaced with the dispersion liquid (IV) of the conductive dispersion liquid prepared in Preparation Example (IV) of conductive polymer dispersion liquid. Other than the replacement above, the same procedure as Example 32 was carried out to produce a winding-type aluminum electrolyte capacitor.

Example 37

The conductive polymer dispersion liquid (I) prepared in Preparation Example (I) of conductive polymer dispersion liquid was replaced with the conductive polymer dispersion liquid (IV) prepared in Preparation Example (IV) of conductive polymer dispersion liquid. Other than the replacement above, the same procedure as Example 35 was carried out to produce a winding-type aluminum electrolyte capacitor.

Example 38

In Example 38 and subsequent Example 39, after providing a conductive polymer on the capacitor element using the conductive polymer dispersion liquid, and before impregnating it with the conductive auxiliary liquid, it was subject to pretreatment by using a intermediate treatment solution. Thus, the Preparation Example (A) of the intermediate treatment solution (A) is explained first.

Preparation Example (A) of Intermediate Treatment Solution (A)

Into 500 g of a mixture solvent in which ethylene glycol and ethanol were mixed at a mass ratio of 1:1 put in an 1 L beaker with a stirrer, 15 g of butyl hydroxybenzene carboxylate ester and 5 g of 3-glycidoxypropyltrimethoxysilane were added. Then, 5 g of polyethylene glycol 400 was added therein. By stirring them for 24 hours, an intermediate treatment solution (A) was prepared was prepared.

The capacitor element same as used in Example 1 was immersed in the conductive polymer dispersion liquid (I), which was prepared in Preparation Example (I) of conductive polymer dispersion liquid. 5 minutes later, it was taken out and dried at room temperature for 30 minutes so as to provide a conductive polymer on the capacitor element.

Then, the capacitor element having formed the conductive polymer above was immersed in the intermediate treatment solution (A). One minute later, it was taken out and dried at 170° C. for 30 minutes to carry out intermediate pretreatment.

As such, the step of providing the conductive polymer on the capacitor element, and subsequent step of the treatment with the intermediate treatment solution (A) were repeated one more time. In other words, the step of providing the conductive polymer on the capacitor element and the step of subsequent intermediate treatment solution were carried out twice.

Then, the capacitor element above was immersed in the conductive auxiliary liquid prepared in Preparation Example 1, to impregnate the capacitor element with the conductive auxiliary liquid. Five minutes later, it was taken out. A package was provided from an exterior material to produce a winding-type aluminum electrolyte capacitors.

Example 39

The conductive polymer dispersion liquid (I) prepared in Preparation Example (I) of conductive polymer dispersion liquid was replaced with the conductive polymer dispersion liquid (IV) prepared in Preparation Example (IV) of conductive polymer dispersion liquid. Other than the replacement above, the same procedure as Example 38 was carried out to produce a winding-type aluminum electrolyte capacitor.

Regarding the winding-type aluminum electrolyte capacitors of Examples 25-39 (hereinafter, the "winding-type aluminum electrolyte capacitor" can be simply called as "capacitor"), the ESR, the capacitance and the leakage current were measured in the same manner as measured in Example 1. Table 10 shows the kinds of the conductive auxiliary liquids, the kinds of the conductive polymer dispersion liquids, the kinds of the pretreatment solutions, and the kinds of the intermediate treatment solutions used in capacitor of these Examples 25-39, including the number of the Preparation Examples and the number of the liquids. Also, Table 11 shows the measurement results of the characteristics in the same manner as shown in Table 1.

TABLE 10

|  | Conductive auxiliary liquid | Conductive polymer dispersion liquid | Pretreatment solution | Intermediate treatment solution |
|---|---|---|---|---|
| Example 25 | 14 | (I) | — | — |
| Example 26 | 15 | (I) | — | — |
| Example 27 | 16 | (I) | — | — |
| Example 28 | 17 | (I) | — | — |
| Example 29 | 1 | (IV) | — | — |
| Example 30 | 3 | (IV) | — | — |
| Example 31 | 8 | (IV) | — | — |
| Example 32 | 1 | (I) | (1) | — |
| Example 33 | 1 | (I) | (2) | — |
| Example 34 | 1 | (I) | (3) | — |
| Example 35 | 1 | (I) | (4) | — |
| Example 36 | 1 | (IV) | (1) | — |
| Example 37 | 1 | (IV) | (4) | — |
| Example 38 | 1 | (I) | — | (A) |
| Example 39 | 1 | (IV) | — | (A) |

TABLE 11

|  | ESR (mΩ) | Capacitance (μF) | Leak current (μA) |
|---|---|---|---|
| Example 25 | 11.3 | 58.4 | 1.5 |
| Example 26 | 11.4 | 58.4 | 1.3 |
| Example 27 | 11.5 | 58.4 | 1.3 |
| Example 28 | 11.2 | 58.3 | 1.7 |
| Example 29 | 11.1 | 58.1 | 1.7 |
| Example 30 | 10.7 | 58.1 | 1.0 |
| Example 31 | 12.9 | 58.4 | 1.3 |
| Example 32 | 11.2 | 58.4 | 1.2 |
| Example 33 | 11.1 | 58.4 | 1.0 |
| Example 34 | 11.0 | 58.4 | 1.0 |
| Example 35 | 10.8 | 58.4 | 1.1 |
| Example 36 | 10.6 | 58.3 | 1.1 |
| Example 37 | 10.3 | 58.4 | 1.0 |
| Example 38 | 10.8 | 58.2 | 1.0 |
| Example 39 | 9.9 | 58.2 | 1.0 |

In addition, after the measurements of the characteristics above, the capacitors of Examples 25-39 (ten samples for each Example) were still left in a dryer at 260° C. for three minutes. On the capacitors after the storage, the ESR, the capacitance and the leakage current as well as the break voltage were measured in the same manner before. The results are shown in Table 12 in the same manner as Table 2.

TABLE 12

|  | ESR (mΩ) | Capacitance (μF) | Leak current (μA) | Break voltage (V) |
|---|---|---|---|---|
| Example 25 | 11.4 | 58.4 | 1.8 | 119 |
| Example 26 | 11.5 | 58.4 | 1.5 | 119 |
| Example 27 | 11.6 | 58.4 | 1.5 | 119 |
| Example 28 | 11.3 | 58.3 | 1.9 | 118 |
| Example 29 | 11.3 | 58.1 | 1.8 | 120 |
| Example 30 | 10.7 | 58.1 | 1.2 | 120 |
| Example 31 | 13.1 | 58.0 | 1.4 | 121 |
| Example 32 | 11.1 | 58.3 | 1.2 | 125 |
| Example 33 | 11.2 | 58.3 | 1.0 | 124 |
| Example 34 | 11.1 | 58.3 | 1.0 | 126 |
| Example 35 | 10.9 | 58.3 | 1.1 | 125 |
| Example 36 | 10.6 | 58.3 | 1.1 | 130 |
| Example 37 | 10.3 | 58.3 | 1.0 | 129 |
| Example 38 | 10.8 | 58.1 | 1.0 | 126 |
| Example 39 | 9.9 | 58.1 | 1.0 | 130 |

In addition, after the measurements of the characteristics as shown in Table 11 above, the capacitors of Examples 25-39 (other ten samples for each Example) were still left in a dryer at 150° C. for 250 hours. On the capacitors after the storage, the ESR, the capacitance and the leakage current were measured in the same manner as before. The results are shown in Table 13 in the same manner as Table 3.

TABLE 13

|  | ESR (mΩ) | Capacitance (μF) | Leak current (μA) |
|---|---|---|---|
| Example 25 | 11.7 | 58.2 | 1.3 |
| Example 26 | 11.7 | 58.2 | 1.1 |
| Example 27 | 11.8 | 58.2 | 1.3 |
| Example 28 | 11.6 | 58.1 | 1.7 |
| Example 29 | 11.4 | 58.0 | 1.6 |
| Example 30 | 10.9 | 58.0 | 1.0 |
| Example 31 | 13.2 | 58.0 | 1.1 |
| Example 32 | 11.7 | 58.2 | 0.9 |
| Example 33 | 11.6 | 58.1 | 0.9 |
| Example 34 | 11.5 | 58.1 | 0.8 |
| Example 35 | 11.4 | 58.1 | 0.9 |
| Example 36 | 10.9 | 58.0 | 1.0 |
| Example 37 | 10.6 | 58.0 | 1.0 |
| Example 38 | 11.1 | 58.0 | 0.9 |
| Example 39 | 10.1 | 58.0 | 0.9 |

As shown in Table 11, the capacitors of Example 25-39 accomplished the following features. The ESR was 9.9-12.9 mΩ, satisfying the set ESR of 15 mΩ or less. The capacitance was 58.1-58.4 μF, satisfying the set capacitance of 50

μF or more. In addition, the capacitors of Examples 25-39 had lower ESR than the capacitors of Comparative Examples 1-3 using the conductive polymer dispersion liquid in the same manner.

Namely, the ESR of the capacitors of Examples 25-39 was 9.9-12.9 mΩ as shown above, whereas the ESR of the capacitors of Comparative Examples 1-3 was 21.8-22.6 mΩ as shown in Table 1. Thus, the capacitors of Examples 25-39 had lower ESR than the capacitors of Comparative Examples 1-3. When comparing the capacitors of Examples 25-39 and the capacitors of Comparative Examples 1-3, the following features can be found. That is, the capacitors of Examples 25-39 used the conductive auxiliary liquid with a lower conductivity than an electrolyte liquid, together with a conductive polymer. They had a lower ESR than the capacitors of Comparative Examples 1-3 having used an electrolyte liquid together with a conductive polymer.

Also, the characteristics of the capacitors of Examples 25-39 shown in the Table 11 are compared with the characteristics of the capacitor of Comparative Example 4 shown in Table 1. The capacitors of Examples 25-39 had lower (smaller) ESR, larger capacitance and fewer leakage current, than the capacitor of Comparative Example 4 in which no impregnation was made with the conductive auxiliary liquid. Namely, as shown in Table 11, the capacitors of Examples 25-39 had an ESR of 9.9-12.9 mΩ, a capacitance of 58.1-58.4 μF, and a leakage current of 1.0-1.7 μA. By contrast, as shown in Table 1, the capacitor of Comparative Example 4 had an ESR of 17.9 mΩ, a capacitance of 51.5 μF, and a leakage current of 4.3 μA. Thus, the capacitors of Examples 25-39 had a lower ESR, a larger capacitance, and few leakage current, than the capacitor of Comparative Example 4 in which no impregnation was made with the conductive auxiliary liquid.

Also, as shown in Table 12, even after the storage at a high temperature of 260° C. for three minutes, the capacitors of Examples 25-39 had the following features. The break voltage was 118-130V, satisfying the set break voltage of 100V or more. Also, the capacitors of Examples 25-39 had an ESR of 9.9-13.1 mΩ after the storage at 260° C. for three minutes as shows in Table 12. By contrast, as shows in Table 2, the capacitors of Comparative Examples 1-3 had an ESR of 24.5-29.9 mΩ after the storage at 260° C. for three minutes. Thus, even after the storage at 260° C. for three minutes, the capacitors of Examples 25-39 had a lower ESR than the capacitors of Comparative Example 1-3. Furthermore, the capacitors of Examples 25-39 had an ESR of 10.1-13.2 mΩ after the storage at 150° C. for 250 hours as shows in Table 13. By contrast, as shows in Table 3, the capacitors of Comparative Examples 1-3 had an ESR of 673.4-899.9 mΩ after the storage at 150° C. for 250 hours. Thus, even after the storage at 150° C. for 250 hours, the capacitors of Examples 25-39 had a lower ESR than the capacitors of Comparative Example 1-3. Also, after the storage at 150° C. for 250 hours, the capacitors of Comparative Examples 1-3 showed significant increase of ESR. By contrast, the capacitors of Examples 25-39 showed had little increase of ESR, and therefore, the heat resistance was superior. In other words, in view of the heat resistance, the capacitors of Examples 25-39 using the conductive auxiliary liquid with a low conductivity were superior to the capacitors of Comparative Example 1-3 using the electrolyte liquid.

Also, the capacitors of Examples 25-39 had a break voltage of 118-130V as shown in Table 12. By contrast, it was 98V in the capacitor of Comparative Example 1; 108V in the capacitor of Comparative Example 2; and 92V in the capacitor of Comparative Example 4. Thus, the capacitors of Examples 25-39 had a higher break voltage, and equivalent to the value of 118V in the capacitor of Comparative Example 3. They showed no characteristic deterioration, and found superior in the voltage resistance characteristics.

Example 40

As explained before, the winding-type aluminum electrolyte capacitors of Examples 1-10 and the winding-type aluminum electrolyte capacitors of Examples 25-39 had the following features. That is, they are of the winding-type aluminum electrolyte capacitors in which the conductive polymer was provided on the capacitor element by using the conductive polymer dispersion liquid. In these winding-type aluminum electrolyte capacitors, two times of the steps of immersing the capacitor element with the conductive polymer dispersion liquid. By contrast, in Example 40 and subsequent Examples 41-47, only one time of immersing the capacitor element with the conductive polymer dispersion liquid was carried out to provide a conductive polymer on the capacitor element. Based on that, winding-type aluminum electrolyte capacitors were produced. Hereinafter, Example 40 is explained in detail.

In the same manner as Example 1, the capacitor element had a set ESR of 15 mΩ or less, a set capacitance of 50 μF or more, and a set break voltage (voltage resistance) of 100V or more. It was immersed in the conductive polymer dispersion liquid (I), which was prepared in Preparation Example (I) of conductive polymer dispersion liquid. Five minutes later, it was taken out and dried at 150° C. for 30 minutes so as to provide a conductive polymer on the capacitor element.

Then, the capacitor element above was immersed in the conductive auxiliary liquid prepared in Preparation Example 1, to impregnate the capacitor element with the conductive auxiliary liquid. Five minutes later, it was taken out. A package was provided from an exterior material to produce a winding-type aluminum electrolyte capacitors.

Example 41

The capacitor element same as used in Example 40 was immersed in the pretreatment solution (1) above. One minute later, it was taken out and dried at 150° C. for 15 minutes to carry out the pretreatment.

Then, the same procedure as Example 40 was carried out to obtain a winding-type aluminum electrolyte capacitor.

Example 42

The pretreatment solution (1) above was replaced with the pretreatment solution (4). Other than the replacement here, the same procedure as Example 41 was carried out to obtain a winding-type aluminum electrolyte capacitor.

Example 43

The capacitor element same as used in Example 40 was immersed in the conductive polymer dispersion liquid (I), which was prepared in Preparation Example (I) of conductive polymer dispersion liquid. Five minutes later, it was taken out and dried at room temperature for 30 minutes so as to provide a conductive polymer on the capacitor element.

Then, the capacitor element above was immersed in the intermediate treatment solution (A). One minute later, it was taken out and dried at 170° C. for 30 minutes to carry out intermediate pretreatment.

Then, the capacitor element above was immersed in the conductive auxiliary liquid prepared in Preparation Example 1, to impregnate the capacitor element with the conductive auxiliary liquid. Five minutes later, it was taken out. A package was provided from an exterior material to produce a winding-type aluminum electrolyte capacitors.

Example 44

The conductive polymer dispersion liquid (I) was replaced with the conductive polymer dispersion liquid (IV). Other than the replacement above, the same procedure as Example 40 was carried out to produce a winding-type aluminum electrolyte capacitor.

Example 45

The conductive polymer dispersion liquid (I) was replaced with the conductive polymer dispersion liquid (IV). Other than the replacement above, the same procedure as Example 41 was carried out to produce a winding-type aluminum electrolyte capacitor.

Example 46

The pretreatment solution (1) above was replaced with the pretreatment solution (4). Other than the replacement here, the same procedure as Example 45 was carried out to obtain a winding-type aluminum electrolyte capacitor.

Example 47

The conductive polymer dispersion liquid (I) was replaced with the conductive polymer dispersion liquid (IV). Other than the replacement above, the same procedure as Example 43 was carried out to produce a winding-type aluminum electrolyte capacitor.

Regarding the winding-type aluminum electrolyte capacitors of Examples 40-47 (hereinafter, the "winding-type aluminum electrolyte capacitor" can be simply called as "capacitor"), the ESR, the capacitance and the leakage current were measured in the same manner as measured in Example 1. Table 14 shows the kinds of the conductive auxiliary liquids, the kinds of the conductive polymer dispersion liquids, the kinds of the pretreatment solutions, and the kinds of the intermediate treatment solutions used in capacitor of these Examples 40-47, including the number of the Preparation Examples and the number of the liquids. Also, Table 15 shows the measurement results of the characteristics in the same manner as shown in Table 1.

TABLE 14

|  | Conductive auxiliary liquid | Conductive polymer dispersion liquid | Pretreatment solution | Intermediate treatment solution |
| --- | --- | --- | --- | --- |
| Example 40 | 1 | (I) | — | — |
| Example 41 | 1 | (I) | (1) | — |
| Example 42 | 1 | (I) | (4) | — |
| Example 43 | 1 | (I) | — | (A) |
| Example 44 | 1 | (IV) | — | — |
| Example 45 | 1 | (IV) | (1) | — |
| Example 46 | 1 | (IV) | (4) | — |
| Example 47 | 1 | (IV) | — | (A) |

TABLE 15

|  | ESR (mΩ) | Capacitance (μF) | Leak current (μA) |
| --- | --- | --- | --- |
| Example 40 | 12.5 | 58.2 | 0.9 |
| Example 41 | 12.2 | 58.2 | 0.9 |
| Example 42 | 12.0 | 58.2 | 0.8 |
| Example 43 | 12.2 | 58.2 | 1.0 |
| Example 44 | 12.2 | 58.2 | 0.9 |
| Example 45 | 11.9 | 58.2 | 0.8 |
| Example 46 | 11.7 | 58.2 | 0.7 |
| Example 47 | 11.8 | 58.2 | 0.8 |

In addition, after the measurements of the characteristics above, the capacitors of Examples 40-47 (ten samples for each Example) were still left in a dryer at 260° C. for three minutes. On the capacitors after the storage, the ESR, the capacitance and the leakage current as well as the break voltage were measured in the same manner before. The results are shown in Table 16 in the same manner as Table 2.

TABLE 16

|  | ESR (mΩ) | Capacitance (μF) | Leak current (μA) | Break voltage (V) |
| --- | --- | --- | --- | --- |
| Example 40 | 12.7 | 58.2 | 1.2 | 121 |
| Example 41 | 12.1 | 58.2 | 1.1 | 125 |
| Example 42 | 12.0 | 58.2 | 0.9 | 126 |
| Example 43 | 12.2 | 58.2 | 1.0 | 128 |
| Example 44 | 12.4 | 58.1 | 1.1 | 124 |
| Example 45 | 11.8 | 58.2 | 0.9 | 132 |
| Example 46 | 11.7 | 58.3 | 0.8 | 134 |
| Example 47 | 11.7 | 58.2 | 0.9 | 134 |

In addition, after the measurements of the characteristics as shown in Table 15 above, the capacitors of Examples 40-47 (other ten samples for each Example) were still left in a dryer at 150° C. for 250 hours. On the capacitors after the storage, the ESR, the capacitance and the leakage current were measured in the same manner as before. The results are shown in Table 17 in the same manner as Table 3.

TABLE 17

|  | ESR (mΩ) | Capacitance (μF) | Leak current (μA) |
| --- | --- | --- | --- |
| Example 40 | 13.3 | 57.9 | 0.8 |
| Example 41 | 12.9 | 57.9 | 0.8 |
| Example 42 | 12.6 | 57.9 | 0.8 |
| Example 43 | 12.8 | 57.9 | 0.9 |
| Example 44 | 12.8 | 57.9 | 0.8 |
| Example 45 | 12.5 | 57.9 | 0.8 |
| Example 46 | 12.2 | 57.9 | 0.7 |
| Example 47 | 12.3 | 57.9 | 0.8 |

As shown in Table 15, the capacitors of Example 40-47 accomplished the following features. The ESR was 11.7-12.5 mΩ, satisfying the set ESR of 15 mΩ or less. The capacitance was 58.2 μF, satisfying the set capacitance of 50 μF or more. Also, the capacitors of Examples 40-47 had a lower ESR than the capacitors of Comparative Examples 1-3, as shown in Table 1

Namely, the ESR of the capacitors of Examples 40-47 was 11.7-12.5 mΩ as shown above, whereas the ESR of the capacitors of Comparative Examples 1-3 was 21.8-22.6 mΩ as shown in Table 1. Thus, the capacitors of Examples 40-47 had a lower ESR than the capacitors of Comparative Examples 1-3. When comparing the capacitors of Examples 40-47 and the capacitors of Comparative Examples 1-3, the following features can be found. That is, the capacitors of Examples 40-47 used the conductive auxiliary liquid with a lower conductivity than an electrolyte liquid, together with a conductive polymer. They had a lower ESR than the capacitors of Comparative Examples 1-3 having used an electrolyte liquid together with a conductive polymer.

Also, here, the capacitor characteristics of the capacitors of Examples 40-47 as shown in Table 15 are compared with the characteristics of the capacitors of Comparative Example 4 as shown in Table 1. Namely, the capacitors of Examples 40-47 had an ESR of 11.7-12.5 mΩ, a capacitance of 58.2 μF, and a leakage current of 0.7-1.0 μA. By contrast, as shown in Table 1, the capacitor of Comparative Example 4 had an ESR of 17.9 mΩ, a capacitance of 51.5 μF, and a leakage current of 4.3 μA. Thus, the capacitors of Examples 40-47 had a lower ESR, a larger capacitance, and few leakage current, than the capacitor of Comparative Example 4 in which no impregnation was made with the conductive auxiliary liquid.

Also, as shown in Table 16, even after the storage at a high temperature of 260° C. for three minutes, the capacitors of Examples 40-47 had the following features. The break voltage was 121-134V, satisfying the set break voltage of 100V or more. Also, the capacitors of Examples 40-47 had an ESR of 11.7-12.7 mΩ after the storage at 260° C. for three minutes. By contrast, as shows in Table 2, the capacitors of Comparative Examples 1-3 had an ESR of 24.5-29.9 mΩ after the storage at 260° C. for three minutes. Thus, even after the storage at 260° C. for three minutes, the capacitors of Examples 40-47 had a lower ESR than the capacitors of Comparative Example 1-3. Furthermore, the capacitors of Examples 40-47 had an ESR of 12.2-13.3 mΩ after the storage at 150° C. for 250 hours as shows in Table 17. By contrast, as shows in Table 3, the capacitors of Comparative Examples 1-3 had an ESR of 673.4-899.9 mΩ after the storage at 150° C. for 250 hours. Thus, even after the storage at 150° C. for 250 hours, the capacitors of Examples 40-47 had a lower ESR than the capacitors of Comparative Example 1-3. Also, after the storage at 150° C. for 250 hours, the capacitors of Comparative Examples 1-3 showed significant increase of ESR. By contrast, the capacitors of Examples 40-47 showed had little increase of ESR, and therefore, the heat resistance was superior. In other words, in view of the heat resistance, the capacitors of Examples 40-47 using the conductive auxiliary liquid with a low conductivity were superior to the capacitors of Comparative Example 1-3 using the electrolyte liquid.

Also, the capacitors of Examples 40-47 had a break voltage of 121-134V as shown in Table 16. By contrast, it was 98V in the capacitor of Comparative Example 1; 108V in the capacitor of Comparative Example 2; and 92V in the capacitor of Comparative Example 4. Thus, the capacitors of Examples 40-47 had a higher break voltage, and equivalent to or better than the value of 118V in the capacitor of Comparative Example 3. They showed no characteristic deterioration, and found superior in the voltage resistance characteristics.

INDUSTRIAL UTILITY

According to the present invention, there can provide a solid electrolyte capacitor with low ESR and that is reliable under a hot condition.

What is claimed is:

1. An electrolyte capacitor, comprising:
    a conductive polymers; and
    a conductive auxiliary liquid,
    wherein the conductive auxiliary liquid comprises a high boiling point organic solvent having a boiling point of 150° C. or more, and an aromatic compound having at least one hydroxyl group and at least one carboxyl group.

2. The electrolyte capacitor according to claim 1, wherein the conductive auxiliary liquid further comprises an aromatic compound having at least one nitro group.

3. The electrolyte capacitor according to claim 1, wherein the conductive auxiliary liquid further comprises an aromatic compound having at least one nitro group and at least one hydroxyl group.

4. The electrolyte capacitor according to claim 1, wherein the conductive auxiliary liquid includes at least one selected from the group consisting of epoxy compound or its hydrolysate, silane or its hydrolysate, and polyalcohol.

5. The electrolyte capacitor according to claim 1, wherein the conductivity of the conductive auxiliary liquid is 2 mS/cm or less.

6. The electrolyte capacitor according to claim 1, wherein the aromatic compound having at least one hydroxyl group and at least one carboxyl group is hydroxybenzene carboxylic acid.

7. The electrolyte capacitor according to claim 1, wherein the aromatic compound having at least one hydroxyl group and at least one carboxyl group is contained at 5 to 20 mass % in the conductive auxiliary liquid.

8. A manufacturing method of an electrolyte capacitor, comprising: providing a conductive polymer on a capacitor element by using a conductive polymer dispersion liquid, the capacitor element including a valve metal and a dielectric layer of an oxide layer of the valve metal formed on a surface of the valve metal; then, immersing the capacitor element in a conductive auxiliary liquid comprising a high boiling point organic solvent having a boiling point of 150° C. or more, and an aromatic compound having at least one hydroxyl group and at least one carboxyl group.

9. The method according to claim 8, wherein the aromatic compound having at least one hydroxyl group and at least one carboxyl group is hydroxybenzene carboxylic acid.

10. The method according to claim 8, wherein the aromatic compound having at least one hydroxyl group and at least one carboxyl group is contained at 5 to 20 mass % in the conductive auxiliary liquid.

11. A manufacturing method of an electrolyte capacitor, comprising: polymerizing a conductive polymer on a capacitor element by means of chemical polymerization of a monomer, the capacitor element including a valve metal and a dielectric layer of an oxide layer of the valve metal formed on a surface of the valve metal; removing impurities by washing before drying the capacitor element; then, immersing the capacitor element in a conductive auxiliary liquid comprising a high boiling point organic solvent having a boiling point of 150° C. or more, and an aromatic compound having at least one hydroxyl group.

12. The manufacturing method according to claim 11, wherein the aromatic compound having at least one hydroxyl group further has at least one carboxyl group.

13. The method according to claim 12, wherein the aromatic compound having at least one hydroxyl group and at least one carboxyl group is hydroxybenzene carboxylic acid.

14. A manufacturing method of an electrolyte capacitor, comprising: subjecting a capacitor element to a pretreatment wherein the capacitor element is treated with a solution comprising an organic solvent a cyclic organic compound having at least one hydroxyl group, and a high boiling point organic solvent having a boiling point of 150° C. or more, the capacitor element including a valve metal and a dielectric layer of an oxide layer of the valve metal formed on a surface of the valve metal; providing a conductive polymer on the capacitor element after the pretreatment by using a conductive polymer dispersion liquid; then, immersing the capacitor element in a conductive auxiliary liquid comprising a high boiling point organic solvent having a boiling point of 150° C. or more, and an aromatic compound having at least one hydroxyl group.

15. The manufacturing method according to claim 14, wherein the aromatic compound having at least one hydroxyl group further has at least one carboxyl group.

16. The method according to claim 15, wherein the aromatic compound having at least one hydroxyl group and at least one carboxyl group is hydroxybenzene carboxylic acid.

17. A manufacturing method of an electrolyte capacitor, comprising: providing a conductive polymer on a capacitor element by using a conductive polymer dispersion liquid, the capacitor element including a valve metal and a dielectric layer of an oxide layer of the valve metal formed on a surface of the valve metal; then, treating the capacitor element with a high boiling point organic solvent having a boiling point of 150° C. or more, or a solution including 20 mass % or more, and less than 100 mass % of a high boiling point organic solvent having a boiling point of 150° C. or more; then, immersing the capacitor element in a conductive auxiliary liquid comprising a high boiling point organic solvent having a boiling point of 150° C. or more, and an aromatic compound having at least one hydroxyl group.

18. The manufacturing method according to claim 17, wherein the aromatic compound having at least one hydroxyl group further has at least one carboxyl group.

19. The method according to claim 18, wherein the aromatic compound having at least one hydroxyl group and at least one carboxyl group is hydroxybenzene carboxylic acid.

* * * * *